(12) United States Patent
Wren et al.

(10) Patent No.: US 12,702,250 B2
(45) Date of Patent: Aug. 11, 2026

(54) ADJUSTABLE COOKING DIVIDER SYSTEM FOR FOOD-HEATING APPLIANCES

(71) Applicant: Happiier, LLC, Deland, FL (US)

(72) Inventors: Emilie Wren, Deland, FL (US); Patricia Schmitz, Deland, FL (US)

(73) Assignee: Happiier, LLC, Deland, FL (US)

( * ) Notice: Subject to any disclaimer, the term of this patent is extended or adjusted under 35 U.S.C. 154(b) by 0 days.

(21) Appl. No.: 19/079,559

(22) Filed: Mar. 14, 2025

(65) Prior Publication Data

US 2025/0221567 A1 Jul. 10, 2025

Related U.S. Application Data

(63) Continuation-in-part of application No. 17/574,502, filed on Jan. 12, 2022, now Pat. No. 12,262,843.

(51) Int. Cl.
*A47J 36/20* (2006.01)

(52) U.S. Cl.
CPC .................................... *A47J 36/20* (2013.01)

(58) Field of Classification Search
CPC .......... A47J 36/16; A47J 36/20; A47J 27/082; A47J 2202/00; A47J 27/10; A47J 27/13; A47J 45/068; A47J 2201/00; A47J 27/00; A47J 27/004; A47J 27/04; A47J 27/12; A47J 27/18; A47J 36/02; A47J 36/022; A47J 36/027; A47J 36/04; A47J 37/01; A47J 37/10; A47J 39/00
USPC ......... 99/416, 448, 325, 342, 411, 415, 418, 99/446, 450, 451, 483
See application file for complete search history.

(56) References Cited

U.S. PATENT DOCUMENTS 1,470,199 A 10/1923 Adina
1,630,787 A 5/1927 Cullen
2,048,572 A 7/1936 Smith
3,724,711 A 4/1973 George
D604,992 S 12/2009 Klein
8,534,483 B1 9/2013 Rodriguez
9,474,411 B2 10/2016 Gattineri
2002/0038802 A1* 4/2002 Tersch .................... A47J 27/12 220/573.4
2004/0083904 A1* 5/2004 Wei-Wen ................ A47J 27/04 99/483

(Continued)

*Primary Examiner* — Chris Q Liu
(74) *Attorney, Agent, or Firm* — H. Brock Kolls

(57) ABSTRACT

The present invention relates to a divider insert system for a food-heating appliance, designed to create compartmentalized cooking sections within the appliance. The system includes a plurality of containers, each having a curvilinear wall configured to match the curvilinear interior surface of the appliance, sidewalls forming enclosed compartments, and a bottom for holding food. The containers interlock or abut without gaps, ensuring structural rigidity and preventing fluid leakage between compartments. A sealing edge may include a heat-resistant gasket to enhance fit and minimize spills. The system further incorporates tapered edges for easy positioning and removal. During use, counteracting sidewall forces stabilize the structure, maintaining compartment integrity. The system allows for simultaneous cooking of multiple foods, preserving separate flavors and textures while ensuring efficient heat distribution. The containers are reusable, made from food-grade materials, and can be easily cleaned and stored for future use.

20 Claims, 20 Drawing Sheets

(56) References Cited

U.S. PATENT DOCUMENTS

| | | | | |
|---|---|---|---|---|
| 2009/0095169 | A1* | 4/2009 | York | A47J 27/004 220/573.5 |
| 2011/0017078 | A1* | 1/2011 | O'Connell | A47J 27/05 99/448 |
| 2017/0190500 | A1* | 7/2017 | De Poly | G01K 11/12 |
| 2018/0206672 | A1* | 7/2018 | Grace | A47J 45/068 |
| 2022/0218147 | A1* | 7/2022 | Wren | A47J 36/16 |
| 2022/0265087 | A1* | 8/2022 | Wilkins | A47J 36/20 |

* cited by examiner 1
15
4
8
7

2
2
1
7
8
13
12
2
10
13
2
14
7
14

1

19/22
5
7
3
2

2
2
7

1
1
7
11
11
2
5
2
2
3
11
11
2
5
1
7
1
7

Typical Slow Cooker
Ceramic Crock
Typical Slow Cooker Metal
Container/Heating Element
10

ADJUSTABLE COOKING DIVIDER SYSTEM FOR FOOD-HEATING APPLIANCES

CROSS-REFERENCE TO RELATED APPLICATIONS

This application contains subject matter which is related to the subject matter of the following co-pending application. The below-listed application is hereby incorporated herein by reference in its entirety:

This is a U.S. non-provisional application that is a continuation in part of a U.S. non-provisional application Ser. No. 17/574,502, inventor Emilie Wren, entitled "DEVICE AND SYSTEM FOR A DIVIDER INSERT FOR A FOOD-HEATING APPLIANCE", filed Jan. 12, 2022; which claims the benefit of a U.S. provisional application, Ser. No. 63/136,944, filed on Jan. 13, 2021, and U.S. provisional application, Ser. No. 63/271,370, filed on Oct. 25, 2021.

TECHNICAL FIELD OF THE INVENTION

The present invention relates to cooking accessories and food preparation systems, specifically to a divider insert system for use within a food-heating appliance. The invention provides compartmentalized cooking sections within the appliance, allowing multiple food items to be cooked simultaneously while maintaining separation between compartments. The divider insert system is designed to fit within various food-heating appliances, such as slow cookers, pressure cookers, air fryers, convection ovens, and other similar cooking devices. The containers are made from food-safe, heat-resistant materials, allowing for reusable, easy-to-clean, and modular compartmentalization. This invention enhances cooking efficiency, flavor isolation, and portion control, making it an improved solution for meal preparation in modern kitchens.

BACKGROUND OF THE INVENTION

Before our invention, food-heating appliances such as slow cookers, pressure cookers, and air fryers lacked an efficient and adaptable solution for simultaneously cooking multiple food items while keeping them separate. These appliances are widely used for meal preparation, slow-cooked recipes, and batch cooking, but they inherently limit users to cooking all ingredients together in a single chamber. This forces flavor blending, prevents dietary customization, and creates inefficiencies for users who wish to prepare multiple foods at once while keeping them distinct. Traditional cooking methods required users to cook foods sequentially, adding time and energy consumption, or to use improvised barriers, which were often unstable, difficult to clean, and poorly fitted to the appliance interior.

Existing cooking methods also fail to optimize space within the appliance. Because food-heating appliances are designed to accommodate a single large cooking chamber, users are often left with wasted space when cooking smaller food portions or trying to prepare multiple side dishes at once. This inefficiency results in inconsistent heating, with smaller portions cooking faster or drying out, while larger portions receive uneven heat exposure due to the lack of proper compartmentalization. Without a structured system for organizing separate food portions, users must resort to awkward stacking, manual repositioning, or frequent stirring, which disrupts the cooking process and compromises texture and flavor consistency.

Another major issue with prior systems is moisture retention and cooking efficiency. Many food-heating appliances rely on steam circulation, heat convection, or pressure cooking cycles to regulate cooking temperature and food texture. However, when food items are placed directly into the cooking unit without a defined separation structure, moisture distribution becomes uneven, leading to soggy or dried-out textures. Similarly, if different food items absorb or release excess moisture, they can affect the overall cooking balance, altering the consistency of dishes that require precise hydration levels, such as grains, proteins, or delicate vegetables.

Additionally, many food-heating appliances lack an effective way to cook multiple food items simultaneously while keeping them separate. Cooking different foods together in a single chamber often results in flavor blending, uneven heat distribution, and inefficient use of space. Users may struggle with inconsistent cooking, where smaller portions overcook while larger portions remain undercooked due to the lack of structured compartmentalization. Moisture retention is also a challenge, as food items absorb and release moisture at different rates, affecting texture and overall cooking results. Without a well-designed separation system, users are forced to cook foods sequentially, monitor cooking progress closely, or use improvised dividers that may be unstable or ineffective. These inefficiencies lead to longer cooking times, wasted energy, and limited meal preparation flexibility.

The present invention addresses these and other shortcomings by providing effective compartmentalized cooking in food-heating appliances and other advantages. For these reasons and shortcomings as well as other reasons and shortcomings there is a long-felt need that gives rise to the present invention.

SUMMARY OF THE INVENTION

The shortcomings of the prior art are overcome and additional advantages are provided through the provision of a divider insert system for a food-heating appliance, comprising a plurality of containers of varying sizes and shapes, each designed to fit within the interior space of the appliance without interfering with its lid or cover.

Each container includes a curvilinear side wall configured to match the curvilinear interior surface of the food-heating appliance, ensuring a secure fit. Additionally, at least one side wall is connected to the curvilinear side wall, wherein a single side wall connects directly or, when multiple side walls are used, they are joined at various angles before collectively connecting to the curvilinear side wall.

The containers have an open top and a bottom of a given thickness, with the bottom perimeter edges securely joined to the curvilinear and side walls, forming enclosed compartments for holding food. When two or more containers are positioned together, their curvilinear side walls collectively form a perimeter matching the appliance's interior, and the side walls of adjoining containers abut ensuring structural rigidity.

This divider insert system allows for compartmentalized cooking, optimizing heat distribution and food separation while ensuring stability, ease of use, and efficient space utilization within the food-heating appliance.

Additional shortcomings of the prior art are overcome and additional advantages are provided through the provision of a divider insert system for a food-heating appliance, which consists of a plurality of containers of varying sizes and shapes. Each container is specifically designed to fit securely within the interior of the appliance without obstructing the lid or cover, allowing for uninterrupted cooking operation.

Each container incorporates a curvilinear side wall, which is contoured to match the curvilinear interior surface of the food-heating appliance, ensuring a stable, precise fit that prevents gaps or shifting. Additionally, at least one side wall extends from the curvilinear side wall, where a single side wall may connect directly, or when multiple side walls are used, they are joined at various angles before ultimately connecting to the curvilinear side wall, allowing for modular compartment arrangements.

The containers include an open top and a bottom, with the bottom edges securely joined to the curvilinear and side walls, forming a stable food-holding compartment. When two or more containers are placed within the appliance, their curvilinear side walls collectively define a perimeter that conforms to the appliance's interior, while their side walls align seamlessly, ensuring structural integrity and resistance to shifting or tilting.

This divider insert system enhances cooking efficiency by providing separate, leak-resistant compartments, allowing users to prepare multiple food items simultaneously while ensuring uniform heat distribution and flavor isolation. The system's secure fit, optimized space utilization, and ease of placement offer a practical, reliable solution for multi-compartment cooking in food-heating appliances.

Additional shortcomings of the prior art are overcome and additional advantages are provided through the provision of a divider insert system for a food-heating appliance, featuring a plurality of interconnected container sections designed to provide stable, compartmentalized food separation within the appliance. The system ensures that multiple food items can be cooked simultaneously while maintaining structural integrity and optimized heat distribution.

Each container section is designed with a curvilinear side wall that conforms to the curvilinear interior surface of the food-heating appliance, ensuring a precise fit. The side walls of each container section are configured to either directly connect to the curvilinear side wall or, when multiple side walls are used, to be connected at various angles before collectively joining the curvilinear side wall. This design enables adaptable compartment shapes to accommodate different food portions and maximize cooking space utilization.

Each container section further includes an open top and a bottom, forming individualized food-holding compartments. A sealing edge is integrated along the top perimeter, providing a secure, stable fit within the appliance while allowing the appliance lid or cover to close properly. The sealing edge also enhances liquid containment and prevents unintended movement during cooking.

When two or more container sections are arranged together, their curvilinear side walls collectively form a continuous perimeter that conforms to the appliance's interior, while the side walls of adjoining containers abut tightly to provide structural rigidity. This configuration ensures that the containers remain stable, resist shifting, and prevent cross-contamination between compartments.

The divider insert system enhances cooking efficiency, stability, and meal preparation flexibility, allowing users to maximize space within the food-heating appliance, maintain separate flavors and textures, and ensure consistent cooking results.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
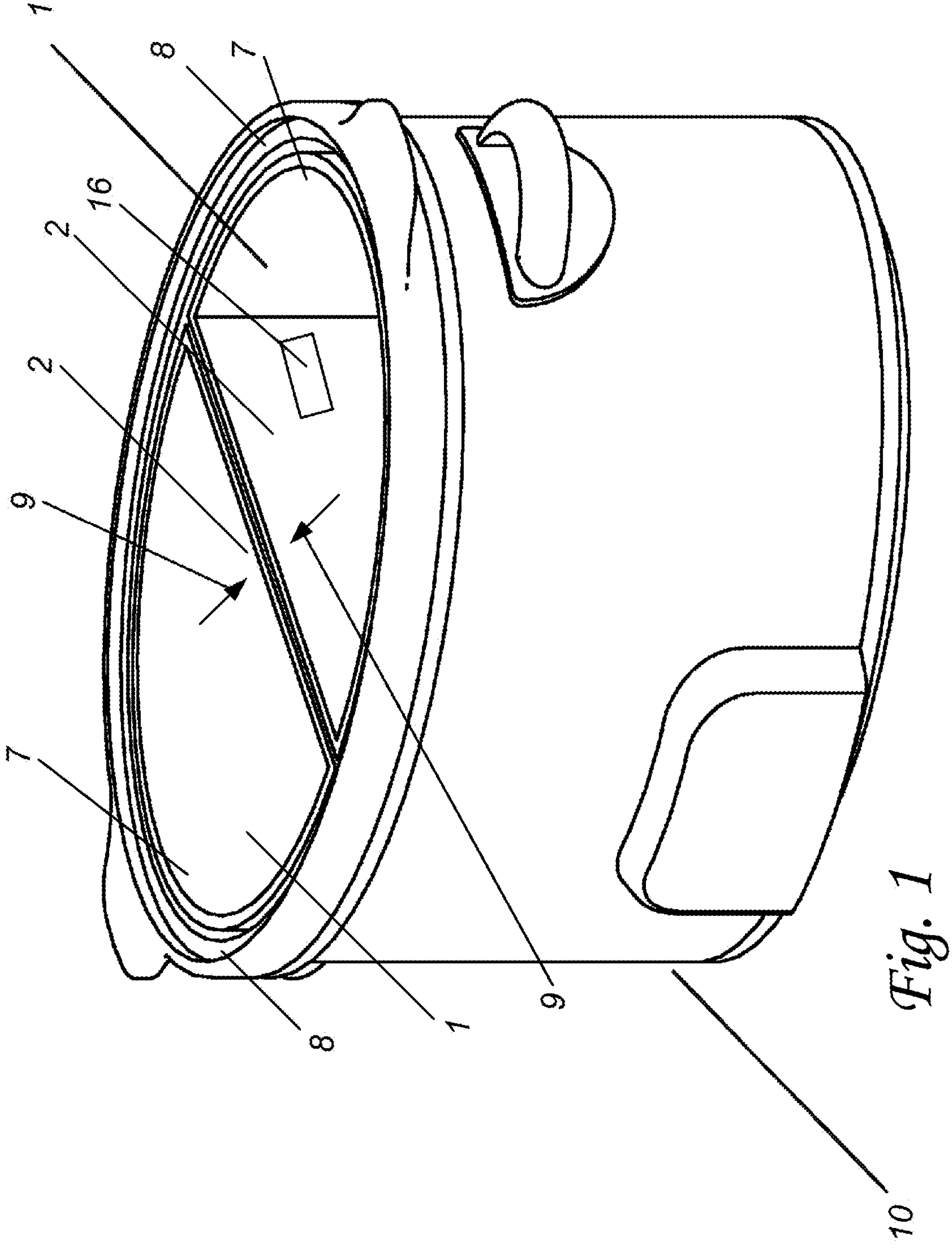
FIG. 1. illustrates one example of a perspective view of an embodiment, two divider inserts, of a device and system for a divider insert for a food-heating appliance inserted in a typical food-heating appliance.

The detailed description explains the preferred embodiments of the invention, together with advantages and features, by way of example with reference to the drawings.

DETAILED DESCRIPTION OF THE INVENTION

The present invention relates to a divider insert system (a plurality of containers 1) for use within a food-heating appliance (food-heating appliance 10) to create compartmentalized cooking sections. The divider insert 1, also referred to as container 1 is designed to fit entirely within the food-heating appliance 10 without protruding above the interior space, ensuring that the lid of the appliance can fully close and seal.

Each divider insert 1 comprises a curvilinear wall 7, which is configured to match the curvilinear interior surface 8 of the food-heating appliance 10. This design ensures a close-fitting perimeter between the divider insert 1 and the interior surface, minimizing gaps and enhancing thermal efficiency.

The divider insert 1 further includes at least one container sidewall 2, which is connected to the curvilinear wall 7. When more than one sidewall 2 is used, they are configured to be connected together at one or more edges at an angle (side wall angle 11) relative to the curvilinear wall 7. These sidewalls 2 form the structural boundary of each compartment, enabling the separation of different food items during the cooking process.

Each divider insert 1 has an open top 3 to allow for easy food placement and retrieval and a container bottom 4 that provides a stable base for holding food. The bottom 4 is integrally connected to the curvilinear wall 7 and the sidewalls 2, forming a sealed compartment suitable for holding both solid and liquid food items.

Two or more divider inserts 1 can be positioned together inside the food-heating appliance 10 such that the curvilinear wall 7 of each insert forms a continuous perimeter along the curvilinear interior surface 8 of the appliance, creating a gap-free arrangement. Additionally, the sidewalls 2 of adjoining divider inserts 1 abut each other without gaps, ensuring structural rigidity and preventing spillage or mixing of food between compartments.

During cooking, food placed within each divider insert 1 exerts counteracting sidewall forces 9, which enhance the structural stability of the sidewalls 2 and prevent them from collapsing or shifting. This ensures that each compartment maintains its shape even when subjected to thermal expansion or moisture buildup.

The divider insert 1 is constructed from a flexible molded material, such as food-grade silicone, thermoplastic elastomers, or heat-resistant polymer composites, allowing for easy removal and cleaning. The material selection provides heat resistance, durability, and non-stick properties, making the divider insert 1 reusable and dishwasher-safe.

The design of the divider insert system allows for customizable compartmentalization within the food-heating appliance 10, enabling users to cook multiple food items simultaneously while preserving their individual flavors and textures. Additionally, the gap-free arrangement enhances heat distribution, reducing cooking time variability across different compartments.

Turning now to the drawings in greater detail, it will be seen that in FIG. 1 one example of a perspective view of an embodiment comprising two divider inserts (divider insert 1) inserted into a food-heating appliance 10. In an exemplary embodiment, the divider inserts 1 (a plurality of containers) each include a curvilinear wall 7 configured to match the curvilinear interior surface 8 of the food-heating appliance 10, ensuring a snug fit. Each divider insert 1 also has at least one container sidewall 2, which connects to the curvilinear wall 7 and extends to define a container bottom 4. The divider inserts 1 are designed such that when placed within the food-heating appliance 10, the sidewalls 2 of adjoining inserts abut each other without gaps, providing structural rigidity and preventing leakage between compartments.

In an exemplary embodiment, the present invention is a divider insert system for a food-heating appliance 10, which provides compartmentalized food storage and cooking capabilities within the appliance. The divider insert system comprises a plurality of containers 1 of varying sizes and shapes, each having a given volume, height, and thickness, enabling customized food portioning and segmented cooking.

Structural Design of the Divider Insert

Each container 1 includes a curvilinear wall 7 that is specifically configured to match the curvilinear interior surface 8 of the food-heating appliance 10. This design ensures a snug fit between the container 1 and the interior surface of the appliance, eliminating gaps along the perimeter and maximizing heat transfer efficiency.

Each container 1 further comprises at least one container sidewall 2, which is structurally connected to the curvilinear wall 7. The container sidewall 2 extends upward from the container bottom 4, forming a rigid boundary that defines the food-holding compartment. When multiple sidewalls 2 are present within a container 1, they may be connected together at one or more edges at any angle 11 relative to the curvilinear wall 7, thereby allowing for a variety of compartment shapes and configurations. This design flexibility ensures that the divider insert system can accommodate different food items and portion sizes, making it adaptable for various cooking needs.

Each container 1 has an open top 3, allowing for easy placement and removal of food items. The container bottom 4, which is of a given thickness, is integrally connected to the curvilinear wall 7 and sidewalls 2, forming a sealed compartment suitable for holding both solid and liquid food items. This sealed construction prevents liquid leakage between compartments, ensuring that different food items remain separated during cooking.

Configuration Within the Food-Heating Appliance

The plurality of containers 1 are designed to be arranged within the food-heating appliance 10 such that they fit entirely within the interior space without protruding. This feature ensures that the appliance lid can fully close and seal, maintaining proper temperature and pressure conditions during cooking. The flush-fitting design further enhances heat distribution and cooking uniformity across all compartments.

When two or more containers 1 are placed within the food-heating appliance 10, the curvilinear wall 7 of each container aligns to form a continuous perimeter that matches the curvilinear interior surface 8 of the appliance. This alignment eliminates gaps, thereby preventing food spillage or fluid migration between compartments. Additionally, the sidewalls 2 of adjacent containers 1 abut each other without gaps, ensuring structural rigidity and preventing movement of the inserts during operation, stirring, or serving.

Key Functional Advantages

- Customizable Configuration: The divider insert system accommodates various cooking needs by allowing different container arrangements, such as two, three, or four compartments.
- Seamless Fit: The curvilinear wall 7 conforms to the curvilinear interior surface 8, creating a gap-free perimeter and optimizing cooking efficiency.
- Enhanced Stability: The sidewalls 2 of adjacent containers 1 abut each other without leaving spaces, providing support and rigidity.
- Leak Prevention: The sealed structure of the container bottom 4 and sidewalls 2 prevents cross-contamination between food compartments.
- Space Optimization: The container 1 fits entirely within the appliance, ensuring that the lid can fully close for optimal heat and pressure retention.

Material and Construction

The divider insert system is constructed from food-grade, heat-resistant materials, such as silicone, thermoplastic elastomers, or other flexible polymer composites, allowing for durability, ease of cleaning, and reusability. The material selection ensures that the divider inserts 1 withstand high temperatures, resist warping, and remain structurally intact during prolonged use.

In an exemplary embodiment, the divider insert system can include multiple container sidewalls 2, which are connected at one or more edges at an angle ranging from 30 degrees to 150 degrees relative to each other, or other suitable angles as may be required and or desired in a particular embodiment. This design allows for customized compartment configurations, enabling the containers 1 to create various shapes and divisions within the food-heating appliance 10.

In an exemplary embodiment, two or more sidewalls 2 may be positioned at a 30-degree angle, forming narrow, wedge-shaped compartments suitable for separating small food portions. Alternatively, sidewalls 2 connected at 90 degrees create square or rectangular compartments, allowing for efficient use of space inside the appliance. Angles up to 150 degrees may be used to create larger, open cooking sections, optimizing airflow and heat distribution during cooking.

This structural flexibility ensures that the divider insert system can be tailored to different cooking needs, providing both rigid partitioning and adaptable compartment layouts.

In an exemplary embodiment, the divider insert system can be constructed using a flexible molded material, selected from the group consisting of food-grade silicone, thermoplastic elastomers, heat-resistant polymer composites, or combinations thereof.

In an exemplary embodiment, the curvilinear wall 7 and sidewalls 2 of each container 1 are made of food-grade silicone, which provides high-temperature resistance, flexibility for easy insertion and removal, and non-stick properties for easy food release. Alternatively, thermoplastic elastomers (TPEs) offer a combination of structural rigidity and elasticity, allowing the divider inserts 1 to maintain shape while still being pliable enough for handling.

Heat-resistant polymer composites can also be used, ensuring durability and reusability while withstanding exposure to high cooking temperatures. The combination of flexibility and heat resistance allows the divider inserts 1 to conform precisely to the curvilinear interior surface 8 of the food-heating appliance 10, eliminating gaps and maximizing cooking efficiency.

In an exemplary embodiment, the divider insert system can be designed to be removably positioned within the food-heating appliance 10, allowing for simultaneous cooking of multiple food items in separate compartments.

In this regard, each divider insert 1 is independently placed, adjusted, or removed, depending on the user's cooking needs. This modular design allows for customized compartmentalization, where users can insert one, two, three, or more containers as required.

The ability to remove individual containers 1 provides additional convenience for meal preparation and serving. For example, after cooking, a container 1 may be lifted directly from the food-heating appliance 10 and placed onto a serving dish, reducing the need for multiple cookware transfers. Additionally, the removable nature of the inserts allows for easier cleaning and maintenance.

In an exemplary embodiment, the divider insert system can include reinforced edges or ridges 20 along the sidewalls 2 to provide additional structural strength.

In an exemplary embodiment, reinforcement ridges 20 extend along the vertical length of the sidewalls 2, preventing collapsing or deformation when food is placed inside the containers 1. This reinforcement ensures that the sidewalls 2 maintain rigidity while supporting varying food weights and cooking pressures.

Additionally, the reinforced edges improve durability and longevity, preventing warping over time due to repeated exposure to heat and moisture. This feature is particularly beneficial for flexible molded materials, ensuring that the divider inserts 1 retain their intended shape through multiple cooking cycles.

In an exemplary embodiment, the divider insert system can include venting perforations in the sidewalls 2 to regulate moisture and steam flow during cooking.

In an exemplary embodiment, small perforations or vent slots 17 are strategically placed along the upper portion of the sidewalls 2, allowing excess steam to escape from each compartment while maintaining cooking efficiency. These perforations help prevent moisture buildup, which can affect texture and cooking uniformity in steamed or slow-cooked foods.

Additionally, the venting perforations 17 promote heat circulation between compartments, ensuring that all sections of the divider insert system receive even cooking conditions without over-steaming or drying out food.

In an exemplary embodiment, the divider insert system can include a non-stick or antimicrobial interior coating 18 applied to the interior surfaces of the containers 1.

In an exemplary embodiment, a food-safe, non-stick coating is applied to the inner surface of each divider insert 1, allowing for easy food release and simplified cleaning. This coating is particularly beneficial for cooking sticky or thick sauces, as it prevents food from sticking to the container walls.

Additionally, an antimicrobial coating 18 may be incorporated into the material composition to inhibit bacterial growth and enhance food safety. This feature ensures that the divider insert system remains sanitary between uses, reducing the risk of cross-contamination and improving long-term usability.

In an exemplary embodiment, the divider insert system can be designed to be compatible with various types of food-heating appliances, including slow cookers, crock-pots, pressure cookers, air fryers, convection ovens, microwave ovens, and combinations thereof.

In an exemplary embodiment, the divider insert system can be configured to fit within a slow cooker or crock-pot, where the curvilinear wall 7 conforms to the curvilinear interior surface 8, creating a gap-free cooking environment. The divider inserts 1 are also adaptable for pressure cookers, where they withstand high-pressure cooking cycles without collapsing or deforming.

For air fryers and convection ovens, the divider insert system enables compartmentalized air frying or baking, allowing multiple foods to be cooked simultaneously with separate flavors and textures. In microwave ovens, the divider inserts 1 can be used for steam cooking or reheating, ensuring that food items remain separated and evenly heated.

The broad compatibility of the divider insert system enhances its versatility, allowing users to seamlessly integrate the inserts into their existing kitchen appliances for diverse cooking applications.

In an exemplary embodiment, in operation, the divider insert system is used to create a compartmentalized cooking structure within a food-heating appliance 10, allowing for efficient and simultaneous cooking of multiple food items while maintaining separation between compartments. The method ensures optimized heat distribution, prevention of food mixing, and ease of handling during and after cooking.

Step 1: Arranging the Containers Inside the Food-Heating Appliance

The method begins with arranging the plurality of containers 1 inside the food-heating appliance 10 to form a gap-free compartmentalized structure. Each divider insert 1 is positioned so that its curvilinear wall 7 conforms precisely to the curvilinear interior surface 8 of the food-heating appliance 10, ensuring a snug fit along the perimeter. Additionally, the container sidewalls 2 of adjacent divider inserts 1 are aligned to abut each other without gaps, providing structural rigidity and preventing fluid or food migration between compartments. This configuration ensures that the divider insert system remains securely positioned during the cooking process, eliminating unwanted movement or shifting.

Step 2: Placing Food Items into Each Selected Container

Once the divider inserts 1 are properly arranged, different food items are placed into each container 1, ensuring that each compartment remains isolated from the others. This step allows for simultaneous cooking of different food types, preventing cross-contamination of flavors, sauces, or seasonings. The containers 1 can accommodate a variety of food items, such as vegetables, proteins, grains, or sauces, each within its designated cooking space.

Step 3: Operating the Food-Heating Appliance to Cook the Food Items

After food placement, the food-heating appliance 10 is activated according to the desired cooking parameters, such as temperature, cooking time, or pressure settings. The divider insert system ensures that heat is evenly distributed throughout the containers 1, allowing all compartments to receive optimal cooking conditions. The gap-free fit between the curvilinear walls 7 and the interior surface 8 enhances thermal efficiency, reducing heat loss and promoting even cooking across different sections of the appliance.

Additionally, the sealed alignment of the container sidewalls 2 prevents liquids or steam from escaping between compartments, preserving the moisture content of food and ensuring flavor retention within each section. If venting perforations are included in certain embodiments, they help regulate steam pressure and prevent excess condensation in each compartment.

Step 4: Removing the Plurality of Containers After Cooking

Once cooking is completed, the food-heating appliance 10 is turned off, and the divider inserts 1 are carefully removed from the appliance. Since each container 1 is individually removable, users can directly lift the containers from the appliance and serve food without additional transfers. This eliminates the need for multiple serving dishes, reducing cleanup and simplifying meal preparation.

The divider inserts 1 maintain their structural integrity during removal, and any counteracting sidewall forces 9 exerted by the food contents help stabilize the compartments, preventing collapse or deformation when lifted from the appliance.

Step 5: Cleaning and Reusing the Containers

Following use, the divider inserts 1 are cleaned and prepared for reuse. The non-stick or antimicrobial interior coating in certain embodiments facilitates easy cleaning, ensuring that food residue does not adhere to the container surfaces. The divider inserts 1 are constructed from heat-resistant, dishwasher-safe materials, such as food-grade silicone or thermoplastic elastomers, allowing for quick and effective cleaning by hand or in a dishwasher.

The ability to reuse the divider inserts 1 enhances the sustainability and longevity of the divider insert system, providing continued convenience for meal preparation while minimizing waste from disposable dividers or liners.

Figure 2:
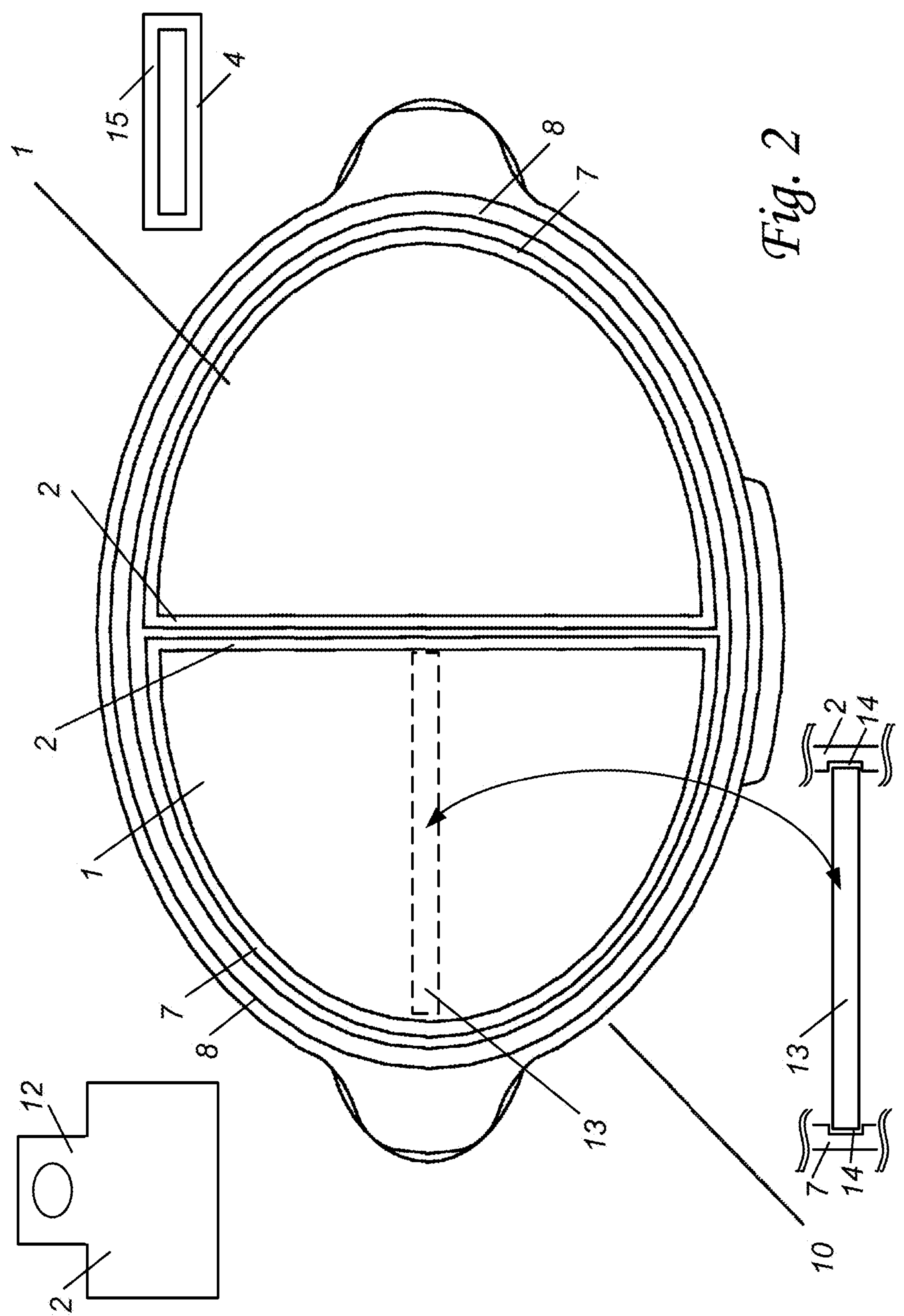
FIG. 2. illustrates one example of a top-down view of an embodiment, two divider inserts, of a device and system for a divider insert for a food-heating appliance inserted in a typical food-heating appliance.

Referring to FIG. 2, there is illustrated one example of a top-down view of an embodiment comprising two divider inserts 1 positioned inside a food-heating appliance 10. In an exemplary embodiment, each divider insert 1 includes a curvilinear wall 7 that forms a continuous perimeter along the curvilinear interior surface 8 of the food-heating appliance 10. The container sidewalls 2 of adjacent divider inserts 1 abut without gaps, forming compartmentalized sections that allow separate food portions to be cooked simultaneously. The divider inserts 1 fit entirely within the appliance without protruding above the interior space, ensuring that the appliance lid can close and seal properly.

In an exemplary embodiment, the divider insert system is designed for use within a food-heating appliance 10, providing compartmentalized cooking and food separation while ensuring efficient heat distribution. The divider insert system comprises a plurality of containers 1 of varying sizes and shapes, each with a defined volume, height, and thickness, allowing for customized food portioning and optimized cooking efficiency.

Structural Configuration of the Divider Insert System

Each container 1 within the divider insert system includes a curvilinear wall 7, which is specifically shaped to match the curvilinear interior surface 8 of the food-heating appliance 10. This curved design ensures a precise, gap-free fit along the inner perimeter of the appliance, maximizing thermal contact and eliminating heat loss through open spaces.

The container 1 further comprises a plurality of sidewalls 2, which together define a structural boundary enclosing a food-holding compartment. At least one sidewall 2 is connected to another sidewall 2 at an edge, forming an angle between 15 degrees and 165 degrees. This angled connection enables the containers 1 to be structured in various geometric configurations, including triangular, trapezoidal, pie-shaped, and rectangular compartments, allowing users to optimize space utilization within the food-heating appliance 10.

Each container 1 features an open top 3, providing direct access to the food contents, and a container bottom 4, which is securely attached to the curvilinear wall 7 and plurality of sidewalls 2. The sealed bottom construction ensures that food and liquids remain contained, preventing unintended leakage into adjacent compartments.

Integration Within the Food-Heating Appliance

The plurality of containers 1 are designed to be arranged and positioned together within the food-heating appliance 10 in a manner that ensures a gap-free cooking environment. The containers 1 are dimensioned such that they fit entirely within the interior space of the appliance, preventing protrusion beyond the rim and allowing the lid to fully close and seal properly.

When two or more containers 1 are positioned adjacent to one another, their curvilinear walls 7 collectively form a continuous perimeter that matches the curvilinear interior surface 8 of the food-heating appliance 10. This configuration eliminates gaps between the perimeter of the appliance and the containers, ensuring that heat is evenly distributed across all compartments.

Additionally, the sidewalls 2 of adjoining containers 1 are aligned and abut each other without gaps, creating a structurally rigid arrangement that prevents the containers 1 from shifting during operation. The tight interlocking structure maintains stability even when food items of varying weights are placed inside different compartments.

Functional Benefits of the Divider Insert System

The design of the divider insert system provides several key advantages, including:

- Customizable Compartmentalization—The plurality of containers 1 can be selected based on meal preparation needs, allowing for multiple food items to be cooked simultaneously while maintaining their individual flavors and textures.
- Gap-Free Fit—The curvilinear walls 7 and adjoining sidewalls 2 create a sealed, continuous perimeter, ensuring efficient heat transfer and preventing cross-contamination between compartments.
- Enhanced Structural Integrity—The angled connection of sidewalls 2 (ranging from 15 degrees to 165 degrees) enables varied compartmental configurations while maintaining rigidity and stability within the food-heating appliance 10.
- Optimized Heat Distribution—The containers 1 ensure that heat flows uniformly across all food compartments, preventing overcooking or undercooking of specific food items.
- Space Efficiency—The varied container sizes and configurations allow for maximum utilization of the appliance's interior volume, accommodating different cooking scenarios such as stew-based meals, individual meal portions, or multi-dish preparation.

Material and Construction

The divider insert system is constructed from flexible and heat-resistant materials, such as food-grade silicone, thermoplastic elastomers, or heat-resistant polymer composites. These materials provide:

- High-temperature resistance, ensuring durability in various cooking conditions (slow-cooking, pressure-cooking, baking, and steaming).
- Structural flexibility, allowing easy insertion and removal from the food-heating appliance 10.
- Non-stick and easy-to-clean properties, minimizing food residue buildup and enabling quick post-cooking cleanup.

The divider insert system enables a customizable, compartmentalized cooking experience within a food-heating appliance 10, providing structural stability, thermal efficiency, and ease of use. The angle-adjustable sidewalls 2, curvilinear wall 7, and gap-free fit ensure optimal performance, making the system ideal for multi-item meal preparation and enhanced cooking convenience.

In an exemplary embodiment, the divider insert system can include at least one sidewall 2 that is equipped with a fold-over handle 12, designed to assist with insertion and removal of the container 1 from the food-heating appliance 10.

In an exemplary embodiment, the fold-over handle 12 can be an integrated extension of the sidewall 2, capable of being lifted or folded down depending on user preference. The handle is hinged or flexible, allowing it to remain flush against the container 1 during cooking to prevent interference with the food-heating appliance lid. When removal is needed, the handle can be lifted and gripped for easy extraction of the divider insert 1.

The fold-over handle 12 provides a secure grip, particularly when the divider insert system is used with hot liquids or steaming food items, ensuring safe handling and reducing the risk of spills or burns. The handle may also be coated with a heat-resistant, non-slip material, further improving user safety and convenience.

In an exemplary embodiment, the divider insert system can include at least one removable divider 13, which allows for further subdivision of food portions within a single container 1.

In an exemplary embodiment, the removable divider 13 can be a thin partition that can be securely positioned within the interior of a container 1, creating two or more sub-compartments. This feature enables greater flexibility in food organization, allowing users to cook smaller portions, separate different food items, or create customizable compartment sizes.

The removable divider 13 may be secured using interlocking grooves 4 or friction fit channels 14 within the sidewalls 2, ensuring stability during cooking. After cooking, the divider can be detached for easy serving and cleaning. The removable nature of the divider allows users to choose between a single large compartment or multiple smaller sections, providing a versatile cooking experience.

In an exemplary embodiment, the divider insert system can include thermally insulating layers 15 integrated into the bottom surface 4 of each container 1.

In an exemplary embodiment, the thermally insulating layers 15 can be embedded within the bottom 4, preventing heat loss and ensuring uniform heat distribution within each container 1. These layers 15 can help maintain consistent cooking temperatures across all compartments, preventing hot spots or uneven heating.

The insulation material may be composed of silicone foam, aerogels, or multi-layer polymer composites, each designed to retain heat within the container while minimizing external heat dissipation. This feature is particularly beneficial for slow-cooking applications, where heat retention is critical for maintaining optimal cooking performance.

Additionally, the thermally insulating layers 15 reduce the risk of heat damage to countertops or external surfaces when the divider inserts 1 are removed from the food-heating appliance 10 and placed on a table or serving area.

In an exemplary embodiment, the divider insert system can be configured such that the containers 1 are capable of interlocking or nesting side-by-side within the food-heating appliance 10, forming a customizable compartmentalized arrangement.

In an exemplary embodiment, each container 1 features interlocking edges or alignment grooves along its sidewalls 2, allowing for precise, gap-free placement when multiple containers are used together. The interlocking mechanism ensures rigidity and prevents movement during cooking, keeping each divider insert 1 securely in place even when food is being stirred or adjusted.

Additionally, the containers 1 may be designed with nested configurations, enabling users to stack or store them efficiently when not in use. This feature enhances the space-saving capability of the system while maintaining its modular, flexible design for various cooking applications.

In an exemplary embodiment, the divider insert system can include at least one temperature-sensitive indicator 16 integrated into a container 1, providing a visual cue when food reaches a predetermined cooking temperature.

In an exemplary embodiment, the temperature-sensitive indicator 16 is a color-changing material or embedded thermal sensor located along the interior or exterior surface of the container 1. The indicator responds to heat variations, visually signaling when a specific temperature threshold is met.

For example:

- A color-change strip may transition from blue to red when the internal temperature exceeds a designated cooking point.
- An embedded thermochromic label can display a “Ready to Serve” message once the food reaches a safe consumption temperature.
- A digital temperature display may be integrated into the sidewall 2, providing real-time temperature readings for enhanced precision.

The temperature-sensitive indicators 16 can provide users with immediate feedback, ensuring that food is cooked to the desired doneness without requiring external thermometers or additional monitoring.

In an exemplary embodiment, in operation, the divider insert system can be utilized within a food-heating appliance 10 to enable compartmentalized cooking, easy handling, and convenient storage for future use. The method ensures efficient meal preparation, proper heat distribution, and organizational benefits for multiple cooking applications.

Step 1: Positioning at Least One of the Plurality of Containers into the Food-Heating Appliance The method can begin with selecting and positioning at least one container 1 from the plurality of containers into the food-heating appliance 10. Each container 1 is designed with a curvilinear wall 7, which conforms precisely to the curvilinear interior surface 8 of the food-heating appliance 10, ensuring a gap-free fit along the perimeter.

When positioning multiple containers 1, they are arranged such that their sidewalls 2 abut each other without gaps, forming a structurally rigid and stable configuration inside the appliance. This prevents movement during cooking and ensures even heat distribution.

The divider inserts 1 may be placed individually or in a customized arrangement, depending on the portion sizes and food types being prepared. If a fold-over handle is included, it can be used to assist in precisely positioning the container 1 inside the food-heating appliance 10 without disrupting adjacent inserts.

Step 2: Cooking the Food at a Predetermined Temperature

Once the container 1 is securely positioned inside the food-heating appliance 10, the appliance is activated and set to a predetermined cooking temperature. The divider insert system is designed to ensure that heat is evenly distributed throughout the containers 1, optimizing cooking conditions for each individual food portion.

If the appliance is a slow cooker or crock-pot, the divider inserts 1 facilitate low and slow heat absorption, ensuring that each compartment maintains moisture and flavor.

If used in an air fryer or convection oven, the divider inserts 1 help create isolated cooking zones, allowing different food items to be air-crisped or baked simultaneously without mixing flavors.

In a pressure cooker, the divider inserts 1 withstand high-pressure steam and liquid immersion, ensuring food remains securely compartmentalized throughout the cooking cycle.

If the containers 1 include a temperature-sensitive indicator, users may monitor visual cues to determine when food has reached the desired cooking temperature without needing to open the appliance.

Step 3: Removing the Container After Cooking

After cooking is complete, the food-heating appliance 10 is turned off, and the container 1 is removed for serving. The divider inserts 1 are designed to allow for easy handling without disturbing the adjacent containers, ensuring that food remains intact and separated.

If a fold-over handle is present, it can be lifted to provide a secure grip when extracting the container 1 from the appliance.

If the divider inserts 1 are constructed with thermally insulating layers 15, they help retain heat in the food while minimizing external surface heat, allowing for safe handling.

Once removed, the container 1 may be used for direct serving, reducing the need for additional serving dishes and minimizing cleanup.

Step 4: Storing the Containers for Future Use

After use, the divider inserts 1 are cleaned and prepared for storage. The containers are designed to be reusable, made from food-grade silicone, thermoplastic elastomers, or heat-resistant polymer composites, which allow for quick cleaning by hand or in a dishwasher.

For efficient storage, the divider inserts 1 may be:

- Stacked or nested inside each other, minimizing storage space.
- Placed in a dedicated storage compartment to keep them organized for future cooking sessions.
- Stored alongside the food-heating appliance 10, ensuring quick accessibility for repeated use.

If the containers 1 feature an interlocking design, they can be nested together compactly, preventing unnecessary movement in storage drawers or cabinets.

Figure 3:
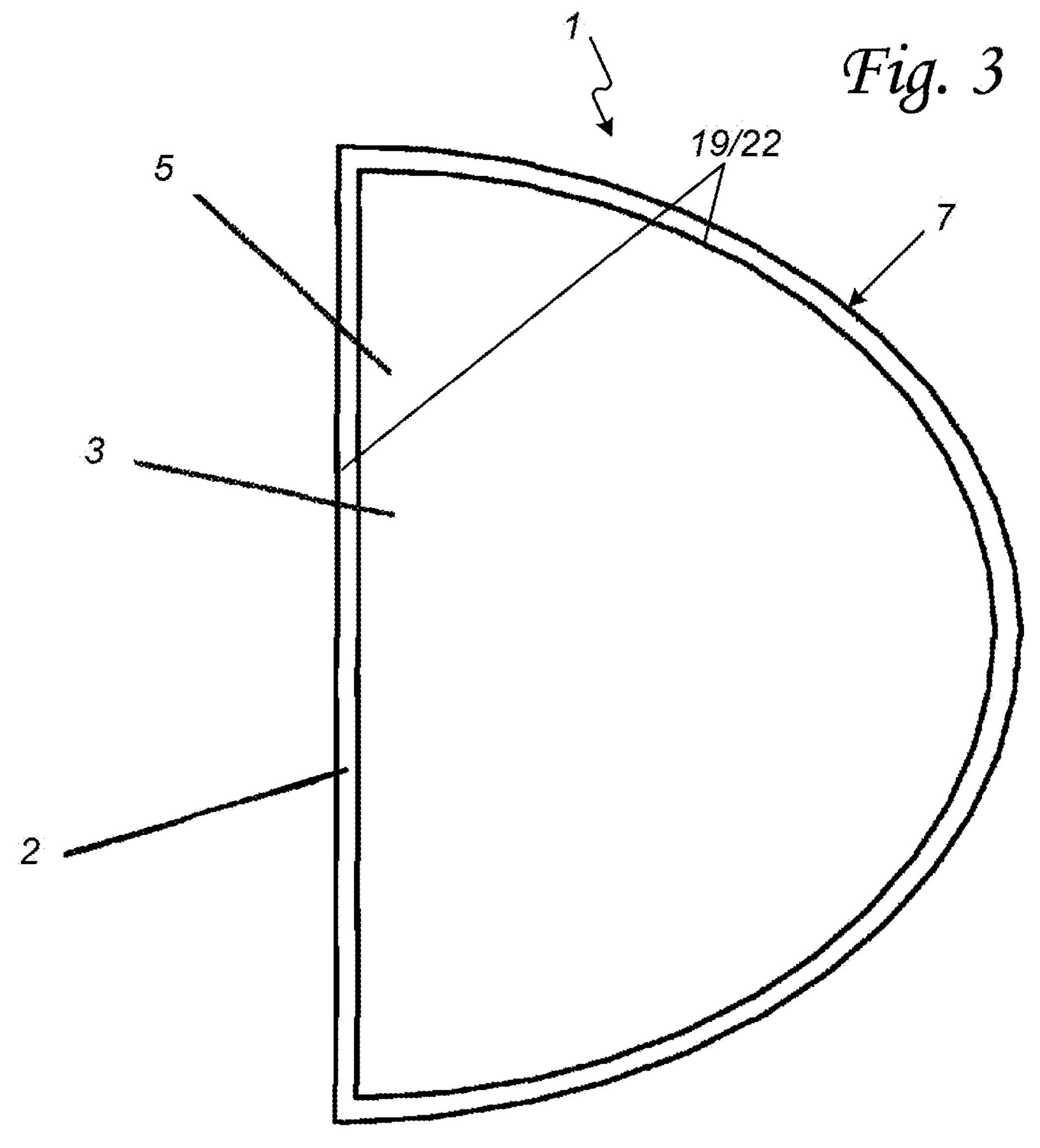
FIG. 3. illustrates one example of a top-down view of an embodiment, one-half of two inserts, of a device and system for a divider insert for a food-heating appliance.

Referring to FIG. 3, there is illustrated one example of a top-down view of an embodiment comprising one-half of two inserts forming a divided cooking space inside a food-heating appliance 10. In an exemplary embodiment, the curvilinear wall 7 of each divider insert 1 conforms to the curvilinear interior surface 8, while a single sidewall 2 defines the compartment boundary. The sidewall 2 interfaces with the adjacent insert to create a gap-free structure that maintains compartmentalization.

In an exemplary embodiment, the divider insert system is designed for use within a food-heating appliance 10, providing compartmentalized cooking, enhanced heat distribution, and structural rigidity. The divider insert system comprises a plurality of interconnected container sections, each forming enclosed compartments for cooking or warming multiple food items simultaneously while preventing cross-contamination or mixing of flavors.

Structural Design of the Interconnected Container Sections

Each container section 1 includes a curvilinear wall 7, which is specifically configured to match the curvilinear interior surface 8 of the food-heating appliance 10. This curved design ensures a precise, gap-free fit along the inner perimeter of the appliance, maximizing thermal contact and cooking efficiency by eliminating heat loss through open spaces.

The container 1 further comprises a plurality of sidewalls 2, which are connected at various angles to each other and to the curvilinear wall 7, forming fully enclosed compartments. The angled connections between the sidewalls 2 allow for flexibility in compartment shape, supporting configurations such as:

- Triangular compartments, ideal for small portion separation
- Rectangular or trapezoidal compartments, suited for bulk food storage
- Pie-slice sections, maximizing curvilinear interior space utilization Each container 1 has an open top 3, allowing for easy placement and retrieval of food items, and a container bottom 4, which is securely attached to the curvilinear wall 7 and sidewalls 2, forming a sealed compartment that holds solid or liquid food.

Sealing Edge for a Secure Fit Without Interference

To enhance the structural integrity and usability of the divider insert system, each container 1 features a sealing edge 19 along its top perimeter proximate to the open end 5. The sealing edge 19 serves several critical functions:

- Secure Fit: The sealing edge 19 ensures that each container 1 remains firmly in place within the food-heating appliance 10, reducing shifting or tilting during cooking.
- Lid Compatibility: The sealing edge 19 is designed to be low-profile, ensuring that it does not interfere with the closure of the appliance lid. This feature allows for airtight sealing, preventing heat and moisture loss.
- Leak Prevention: The sealing edge 19 creates a fluid barrier, reducing spillage when cooking liquids or semi-solid foods, such as soups, stews, or sauces.

Precise Fit Within the Food-Heating Appliance

The divider insert system is designed so that the plurality of containers 1 fits entirely within the interior space of the food-heating appliance 10, preventing any protrusion above the rim of the appliance. This configuration allows for:

- Lid Closure and Heat Retention: Since the containers 1 do not extend above the interior space, the appliance lid can fully close and seal, maintaining optimal cooking conditions.
- Improved Cooking Efficiency: The tight fit of the containers 1 ensures that heat is distributed evenly, eliminating cold spots and allowing for precise temperature control.

Interconnected Container Sections for Structural Rigidity

When two or more containers 1 are positioned together within the food-heating appliance 10, they are arranged to create a continuous, gap-free perimeter. Specifically:

- The curvilinear walls 7 of adjacent containers 1 align seamlessly with the curvilinear interior surface 8, eliminating open gaps along the appliance's perimeter.
- The sidewalls 2 of adjoining containers 1 abut each other without gaps, providing increased structural rigidity and preventing unintended shifting during cooking.
- The interlocking fit of the sidewalls 2 ensures that the divider insert system remains stable even when subjected to stirring, food weight, or liquid movement.

The seamless integration of the containers 1 prevents liquid or steam leakage between compartments, maintaining distinct cooking environments for different food types.

Additionally, the divider inserts 1 may include:

Non-stick coatings for easy food removal

Antimicrobial properties to reduce bacterial growth

Dishwasher-safe surfaces for convenient cleaning

In an exemplary embodiment, the divider insert system can further include a heat-resistant gasket 22 integrated into the sealing edge 19, which enhances the fit of the divider insert system within the food-heating appliance 10 while minimizing liquid leakage between compartments.

In an exemplary embodiment, the heat-resistant gasket 22 is constructed from high-temperature silicone, rubberized polymer, or thermoplastic elastomers (TPEs), allowing it to maintain flexibility and durability when exposed to extended cooking cycles. The gasket 22 material is designed to withstand high temperatures, pressure fluctuations, and moisture exposure, ensuring long-term integrity without degradation.

The gasket 22 can be embedded or attached along the top sealing edge 19 of each container 1, ensuring a tight and secure fit between the divider insert system and the interior of the food-heating appliance 10. The key benefits of the heat-resistant gasket 22 include:

- Enhanced Fit and Stability: The gasket 22 material compresses slightly, allowing for a secure fit within the food-heating appliance 10 while preventing unintended movement of the divider inserts 1 during cooking.
- Liquid Containment: The gasket 22 creates a sealing barrier along the sealing edge 19, preventing liquid from seeping between adjacent compartments. This ensures that sauces, broths, or juices remain within their respective sections, preserving flavor separation during cooking.
- Improved Heat Retention: The gasket 22 helps maintain a closed, insulated environment, reducing heat escape and enhancing energy efficiency within the food-heating appliance 10.

Additionally, the gasket 22 may include textured ridges 20 or microchannels that facilitate controlled steam venting when necessary while maintaining liquid separation. The inclusion of a heat-resistant gasket significantly improves the performance and functionality of the divider insert system, ensuring a mess-free, efficient cooking experience.

In an exemplary embodiment, the divider insert system can further be designed such that food placed within each compartment generates counteracting sidewall forces 9, which stabilize the sidewalls 2 and prevent collapse or leakage between compartments.

In an exemplary embodiment, when food items, liquids, or cooking ingredients are placed into each container 1, the weight and pressure distribution within the compartments creates outward lateral forces against the sidewalls 2. These counteracting forces 9 serve several functional purposes:

- Sidewall Reinforcement: The outward force applied by the food contents pushes against the sidewalls 2, reinforcing their structural rigidity and preventing buckling or deformation during cooking. This ensures that the divider insert system maintains its intended shape and compartmentalization throughout the cooking process.

Leakage Prevention: The counteracting forces ensure that the sidewalls 2 remain tightly abutted against each other, minimizing gaps between adjoining containers 1. This prevents liquid from seeping between compartments, maintaining effective food separation.

Thermal Expansion Compensation: As heat is applied to the divider insert system, materials may expand slightly. The counteracting sidewall forces help mitigate thermal expansion effects, ensuring that the containers 1 remain structurally sound without excessive movement or shifting.

The divider insert system is engineered so that the sidewalls 2 exhibit slight flexibility, allowing them to adapt to different food densities and weights while still maintaining compartmental integrity. This design ensures that food items remain properly contained, preventing spills, cross-contamination, or unintended mixing of flavors.

By utilizing counteracting sidewall forces 9, the divider insert system achieves enhanced stability, improved fluid containment, and increased durability, making it ideal for multi-compartment cooking applications.

In an exemplary embodiment, in operation, the divider insert system can be used to create a customizable, compartmentalized cooking environment within a food-heating appliance 10. The method ensures efficient heat distribution, food separation, and convenient handling during the cooking and serving process.

Step 1: Selecting One or More Containers from the Plurality of Interconnected Container Sections The method begins by selecting one or more containers 1 from the plurality of interconnected container sections. Each container 1 is designed to be independently selected and removed based on user preference and cooking requirements.

In an exemplary embodiment, users may choose:

A single large container 1 for bulk cooking or large food portions.

Multiple smaller containers for cooking different food items simultaneously while keeping them separate.

A combination of differently sized containers to fit specific meal-preparation needs.

The interconnected design allows for modular compartmentalization, ensuring that each selected container 1 fits securely while maintaining structural integrity within the food-heating appliance 10.

Step 2: Inserting Each Selected Container into the Food-Heating Appliance

Once the appropriate containers 1 have been selected, they are inserted into the food-heating appliance 10. Each container 1 includes a curvilinear wall 7, which conforms to the curvilinear interior surface 8 of the food-heating appliance 10, ensuring a snug and gap-free fit.

When multiple containers 1 are inserted:

Their sidewalls 2 abut each other without gaps, ensuring structural stability and preventing unintended shifting during cooking.

The sealing edge 19, optionally including a heat-resistant gasket 22, ensures a tight fit, preventing liquid leakage or flavor cross-contamination.

If included, fold-over handles may be used to assist in precise placement of the containers 1 within the food-heating appliance 10.

This step ensures that the divider insert system is properly positioned to facilitate even cooking while maximizing available interior space.

Step 3: Placing a Plurality of Uncooked Food Items into Each Selected Container

Once the containers 1 are securely positioned, uncooked food items are placed into each compartment. The divider insert system allows for:

Simultaneous cooking of multiple foods, keeping them separated and intact.

Compartmentalized heat exposure, ensuring even cooking while preventing flavor contamination between different food items.

Customized portioning, where users can place proteins, vegetables, sauces, or grains into separate containers 1 based on individual cooking times and temperature requirements.

For liquid-based foods (e.g., soups, stews, or sauces), the sealing edge 5 and counteracting sidewall forces 9 prevent spillage or cross-contamination between compartments.

Step 4: Operating the Food-Heating Appliance to Cook the Food Items

After the food items are placed inside the divider insert system, the food-heating appliance 10 is activated to cook the food at a predetermined temperature.

During cooking:

The curvilinear wall 7 and sealed compartment design ensure even heat distribution, preventing hot spots and promoting uniform cooking across all containers 1.

The sidewalls 2 of adjacent containers abut each other tightly, ensuring structural rigidity, even when exposed to moisture, steam, or pressure changes.

If the containers 1 include temperature-sensitive indicators (as described in claim 15), users may visually monitor color changes or thermal feedback to determine when food reaches optimal cooking temperature.

This step ensures efficient energy usage while maintaining separate, distinct cooking zones within the food-heating appliance 10.

Step 5: Removing the Plurality of Containers from the Food-Heating Appliance after Cooking is Complete Once cooking is complete, the containers 1 are safely removed from the food-heating appliance 10.

If present, fold-over handles provide a secure grip for easy removal.

The heat-resistant gasket 22 along the sealing edge 19 ensures that liquids remain contained even when lifting the divider inserts 1.

The containers 1 maintain their structural integrity, preventing sidewall collapse or deformation due to food weight or temperature fluctuations.

After removal, the containers 1 can be placed directly onto serving dishes or used for storage, eliminating the need for separate transfer bowls, thereby reducing cleanup time.

Figure 4:
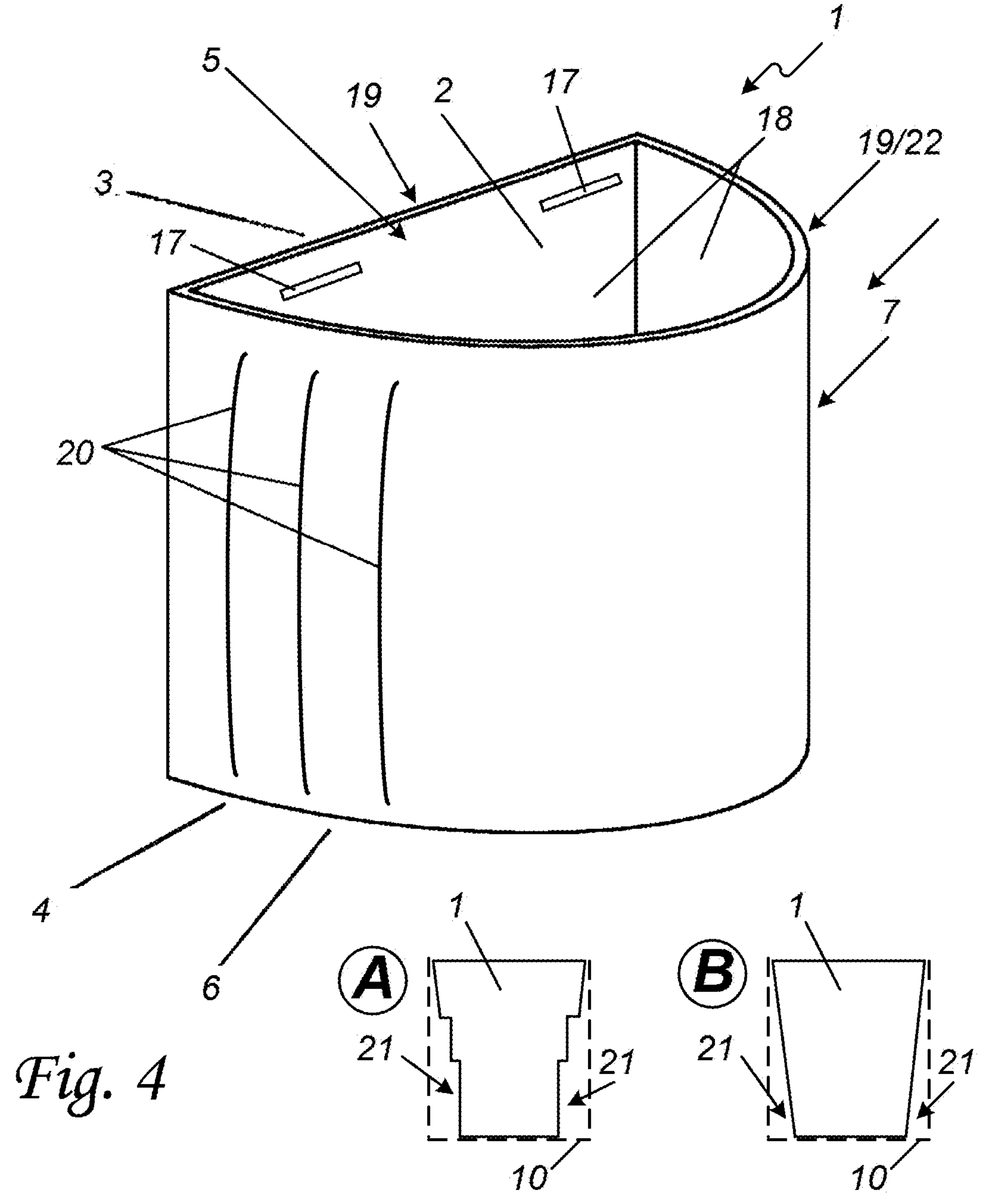
FIG. 4. illustrates one example of a perspective view of an embodiment, one-half of two inserts, of a device and system for a divider insert for a food-heating appliance.

Referring to FIG. 4, there is illustrated one example of a perspective view of an embodiment comprising one-half of two inserts. In an exemplary embodiment, the divider insert 1 features a curvilinear wall 7, at least one sidewall 2, and a container bottom 4 that collectively form a food-holding compartment. The structure ensures counteracting sidewall forces 9, which stabilize the sidewalls 2 when filled with food, preventing collapse or leakage.

In an exemplary embodiment, the divider insert system can include at least one container 1, which is designed to fit securely within a food-heating appliance 10. To facilitate easy insertion, positioning, and removal, each container 1 may feature tapered edges 21, which allow for a precise and adaptable fit within the interior space of the appliance.

Tapered Edges for Optimized Fit

Each container 1 comprises a curvilinear wall 7, a plurality of sidewalls 2, and a container bottom 4, forming a self-contained compartment for cooking or food storage. The tapered edges 21 are strategically incorporated into the sidewalls 2 and/or the curvilinear wall 7 to streamline positioning within the food-heating appliance 10.

In an exemplary embodiment, the tapered edges 21 are designed to facilitate easy insertion, alignment, secure positioning within the food-heating appliance 10, and increase container 1 rigidity and strength. The tapered edges 21 may be implemented in different configurations, including:

- Stair-stepped tapering, as illustrated in FIG. 4, reference 'A', where the edges gradually step down in a tiered manner, providing incremental contact points for enhanced stability and adaptability within the appliance.
- Straight-walled tapering, as illustrated in FIG. 4, reference 'B', where the side walls maintain a consistent angled slope, ensuring a smooth, uniform fit against the curvilinear interior surface 8 of the food-heating appliance 10.
- Other suitable tapered designs, which may be configured as required and/or desired for particular embodiments, optimizing fit, ease of removal, and compatibility with various appliance shapes and dimensions.

Additionally, the tapered edges 21 are angled to:

- Gradually narrow towards the base of the container 1, allowing for precise alignment and guided insertion into the appliance.
- Create a snug fit by ensuring the curvilinear wall 7 conforms seamlessly to the curvilinear interior surface 8 of the food-heating appliance 10, minimizing gaps and movement.
- Compensate for appliance design variations, enabling the divider insert system to be compatible with different food-heating appliance models and sizes, ensuring secure placement and uniform heat distribution.

Ease of Positioning and Removal

The tapered edges 21 provide functional benefits for both placement and extraction of the divider inserts 1:

- Smooth Insertion: When positioning the container 1 inside the food-heating appliance 10, the tapered edges 21 allow the insert to glide into place without resistance. This feature is particularly useful when multiple containers are being arranged side by side, ensuring a precise fit without unnecessary force.
- Stability and Secure Fit: The gradual tapering ensures that, once positioned, the divider inserts 1 remain securely in place, preventing unintended movement during cooking. This design also maximizes heat transfer efficiency by maintaining full contact between the container walls and the heating surface of the appliance.
- Easy Removal: After cooking, the tapered edges 21 facilitate a controlled and effortless lift, reducing the risk of spilling food or liquid. If fold-over handles are included, they can further assist in grip and extraction.

Material and Construction

The tapered edges 21 may be formed from food-grade silicone, thermoplastic elastomers, or heat-resistant polymer composites, ensuring flexibility and durability while maintaining structural integrity. The design of the tapered edges 21 can be adapted to:

- Provide slight compression during insertion, forming a secure seal against the appliance interior.
- Enable stackable or nesting storage when the divider inserts 1 are not in use.

Figure 5:
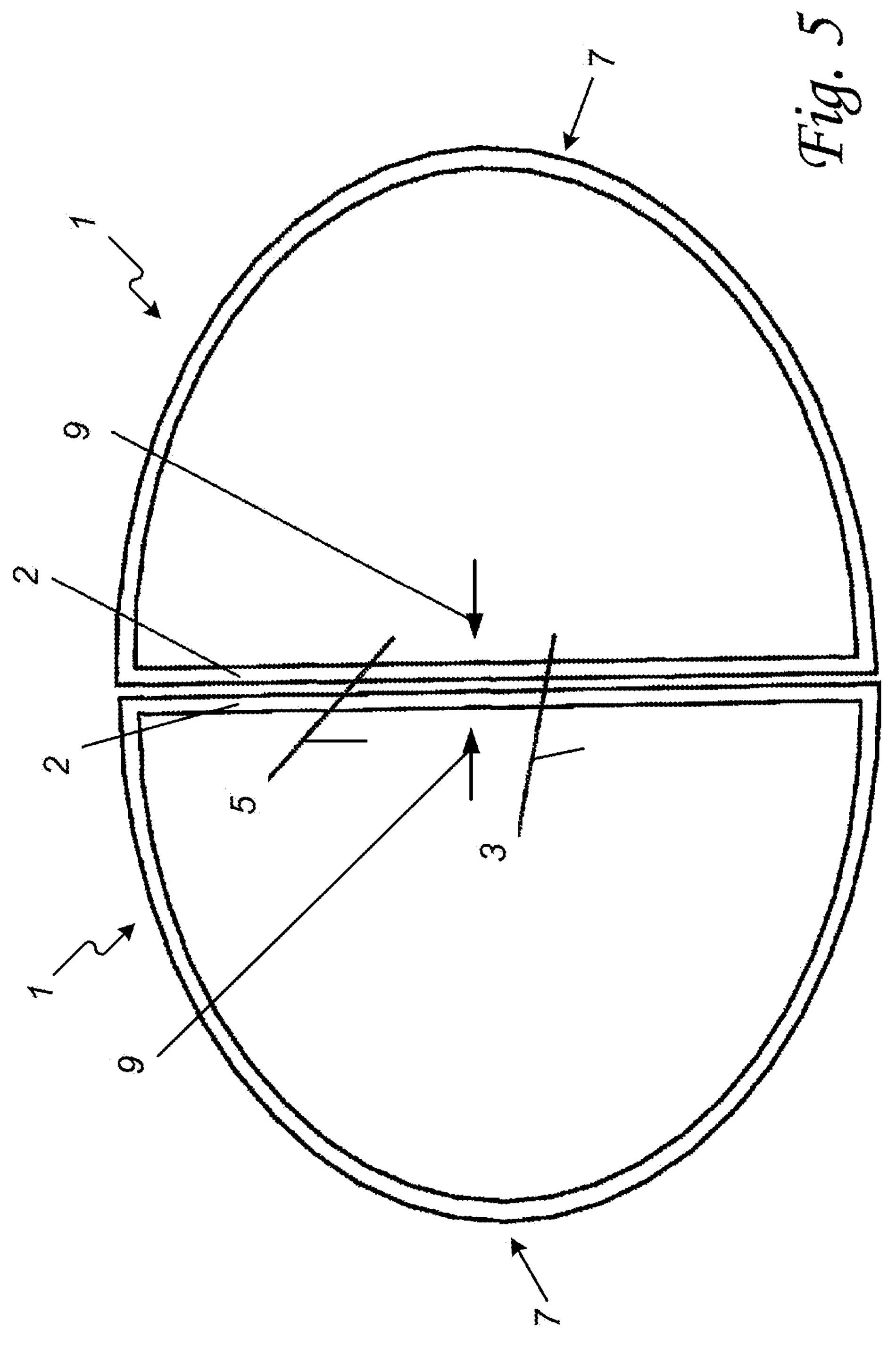
FIG. 5. illustrates one example of a top-down view of an embodiment, two divider inserts, of a device and system for a divider insert for a food-heating appliance.

Referring to FIG. 5, there is illustrated one example of a top-down view of an embodiment comprising two divider inserts 1 within a food-heating appliance 10. In an exemplary embodiment, the sidewalls 2 of adjacent inserts meet at a side wall angle 11, forming sealed compartments. The curvilinear wall 7 maintains a close fit to the curvilinear interior surface 8, enhancing heat efficiency.

In an exemplary embodiment, a divider insert system for a food-heating appliance 10, comprising a plurality of containers 1 of varying sizes and shapes, each designed to fit securely within the interior space of the food-heating appliance 10 without interfering with its lid or cover.

Each container 1 includes a curvilinear side wall 7 configured to match the curvilinear interior surface 8 of the food-heating appliance 10, ensuring a precise fit that eliminates gaps. Additionally, at least one side wall 2 extends from the curvilinear side wall 7, wherein a single side wall 2 connects directly to the curvilinear side wall 7, and wherein when multiple side walls 2 are used, they are connected at one or more edges at various angles before collectively connecting to the curvilinear side wall 7. This design enables versatile compartment configurations while maintaining a structurally reinforced and stable construction.

Each container 1 further includes an open top 3 and a bottom 4 of a given thickness, with the bottom perimeter edges securely joined to the curvilinear side wall 7 and side walls 2, forming a food-holding compartment. The plurality of containers 1 is configured to fit entirely within the food-heating appliance 10, ensuring that they do not interfere with the appliance's lid or cover, thereby maintaining proper sealing, heat retention, and pressure regulation.

When two or more containers 1 are selected and positioned together, their curvilinear side walls 7 collectively form a perimeter that conforms to the interior perimeter of the food-heating appliance 10, ensuring a seamless fit. Additionally, the side walls 2 of adjoining containers 1 abut tightly, providing structural rigidity to prevent shifting, tilting, or liquid leakage between compartments.

This divider insert system enables efficient compartmentalized cooking, allowing users to prepare multiple food items simultaneously while maintaining separate flavors and moisture levels. The system optimizes heat distribution, enhances cooking efficiency, and ensures stable, secure placement within the food-heating appliance 10.

Figure 6:
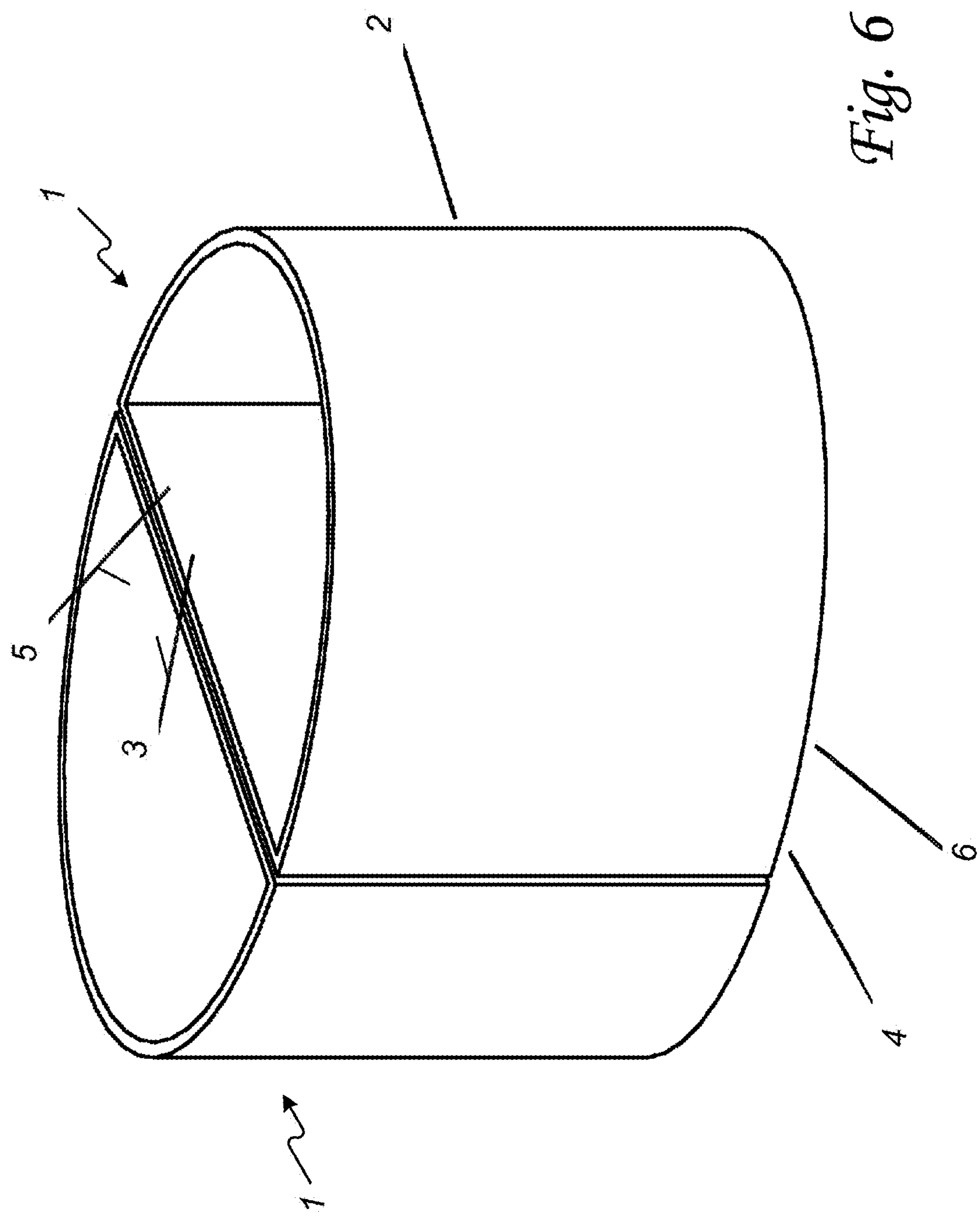
FIG. 6. illustrates one example of a perspective view of an embodiment, two divider inserts, of a device and system for a divider insert for a food-heating appliance.

Referring to FIG. 6, there is illustrated one example of a perspective view of an embodiment comprising two divider inserts 1. In an exemplary embodiment, the inserts are removable and washable, making them reusable for different cooking applications. The sidewalls 2 form structurally rigid compartments, preventing movement inside the food-heating appliance 10.

Figure 7:
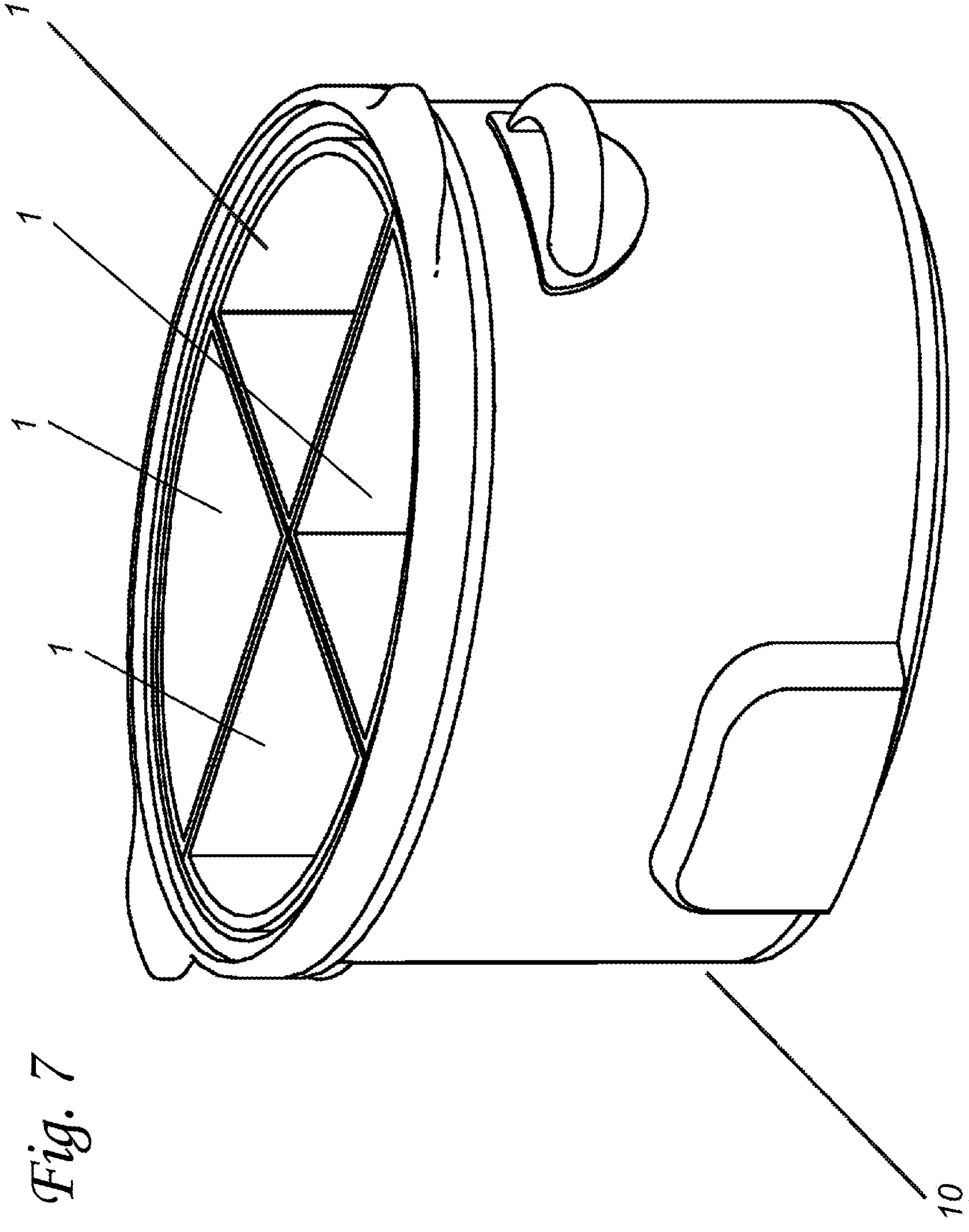
FIG. 7. illustrates one example of a perspective view of an embodiment, four divider inserts, of a device and system for a divider insert for a food-heating appliance inserted in a typical food-heating appliance.

Referring to FIG. 7, there is illustrated one example of a perspective view of an embodiment comprising four divider inserts 1 within a food-heating appliance 10. In an exemplary embodiment, the divider inserts 1 are arranged in a radial pattern, utilizing the curvilinear interior surface 8 to form four distinct compartments.

Figure 8:
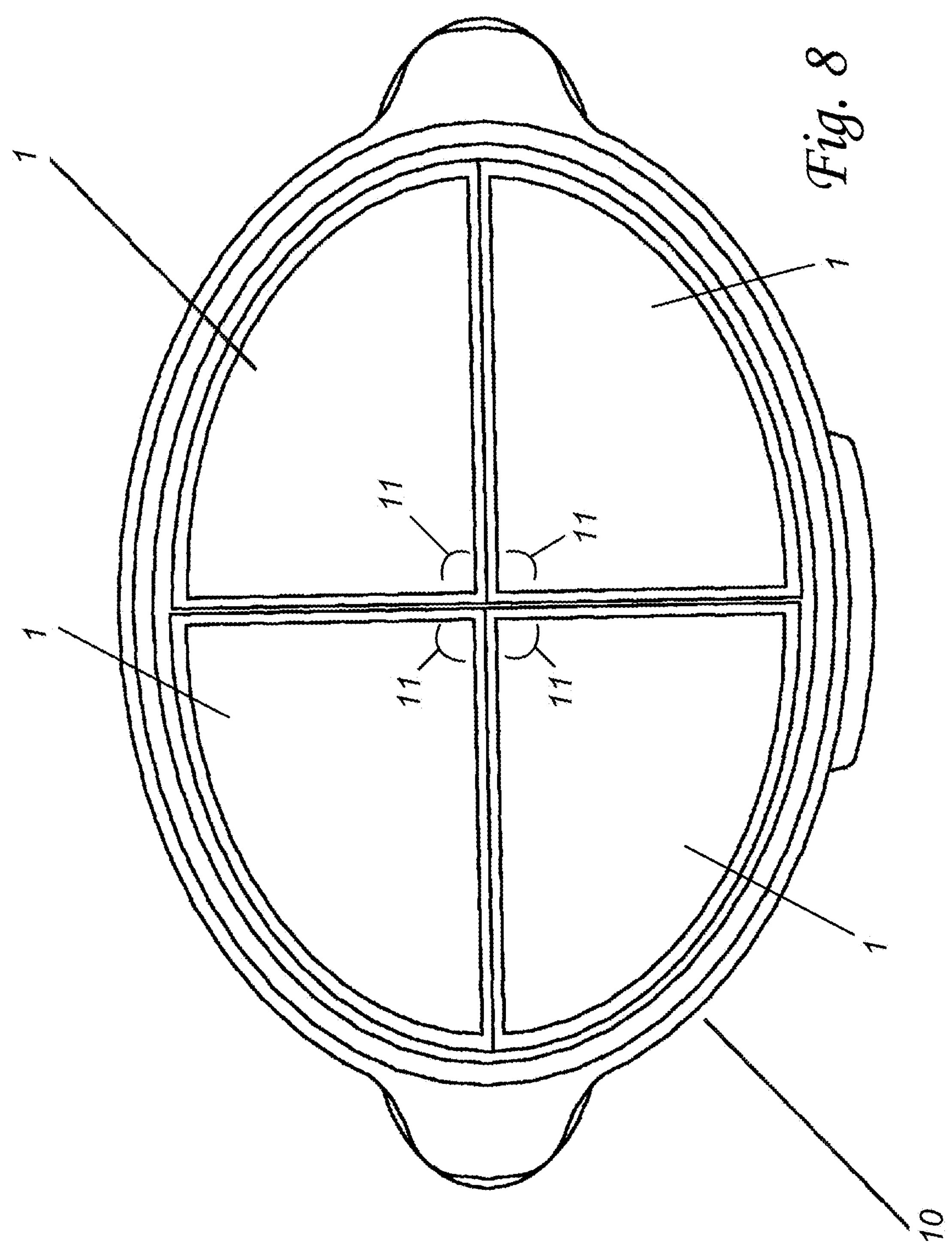
FIG. 8. illustrates one example of a top-down view of an embodiment, four divider inserts, of a device and system for a divider insert for a food-heating appliance inserted in a typical food-heating appliance.

Referring to FIG. 8, there is illustrated one example of a top-down view of an embodiment comprising four divider inserts 1 inside a food-heating appliance 10. In an exemplary embodiment, each insert features a curvilinear wall 7, a container bottom 4, and sidewalls 2, ensuring compartmentalized cooking.

Figure 9:
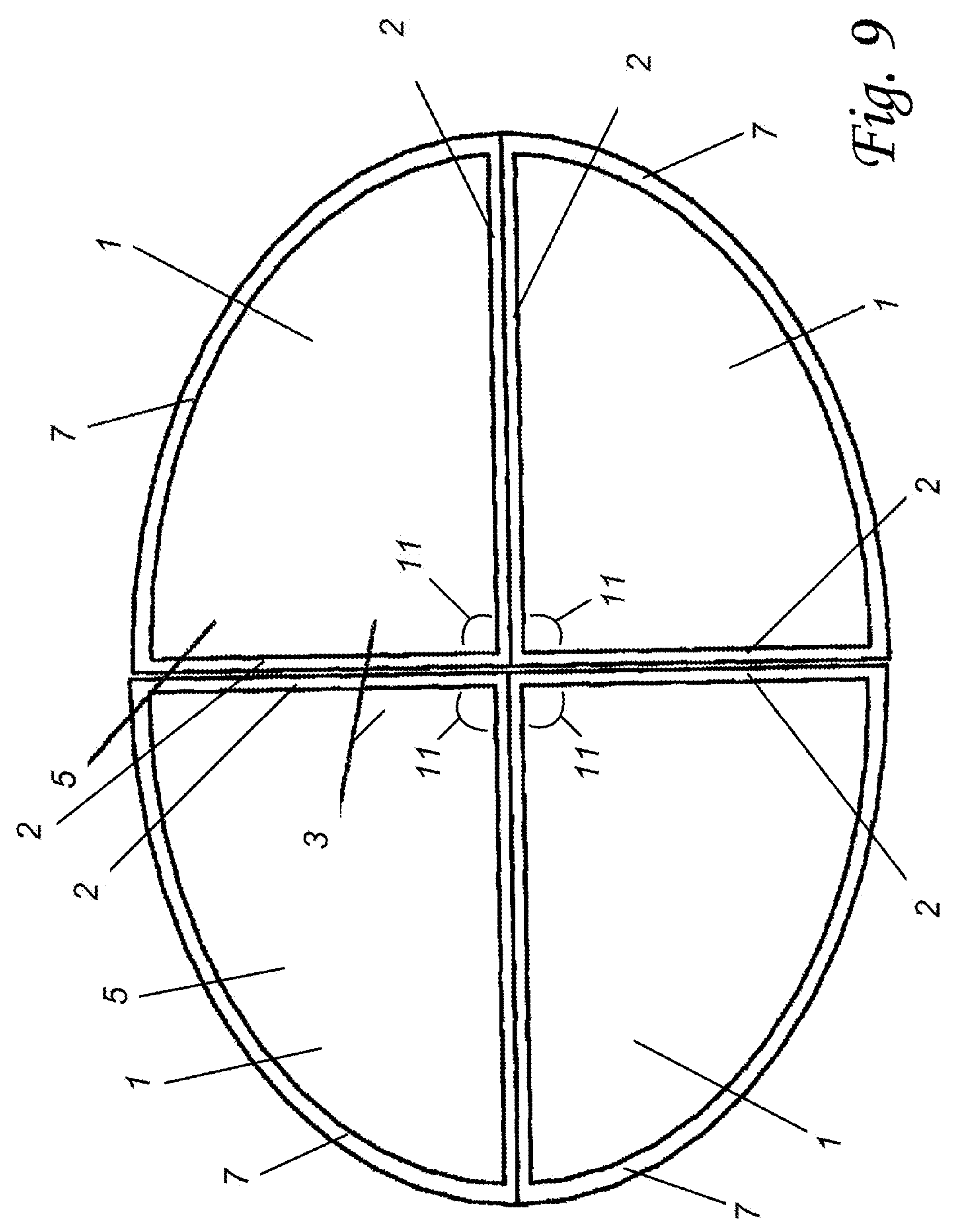
FIG. 9. illustrates one example of a top-down view of an embodiment, four divider inserts, of a device and system for a divider insert for a food-heating appliance.

Referring to FIG. 9, there is illustrated one example of a top-down view of an embodiment comprising four divider inserts 1. In an exemplary embodiment, the inserts meet at side wall angles 11, maintaining leak-proof compartmentalization.

Figure 10:
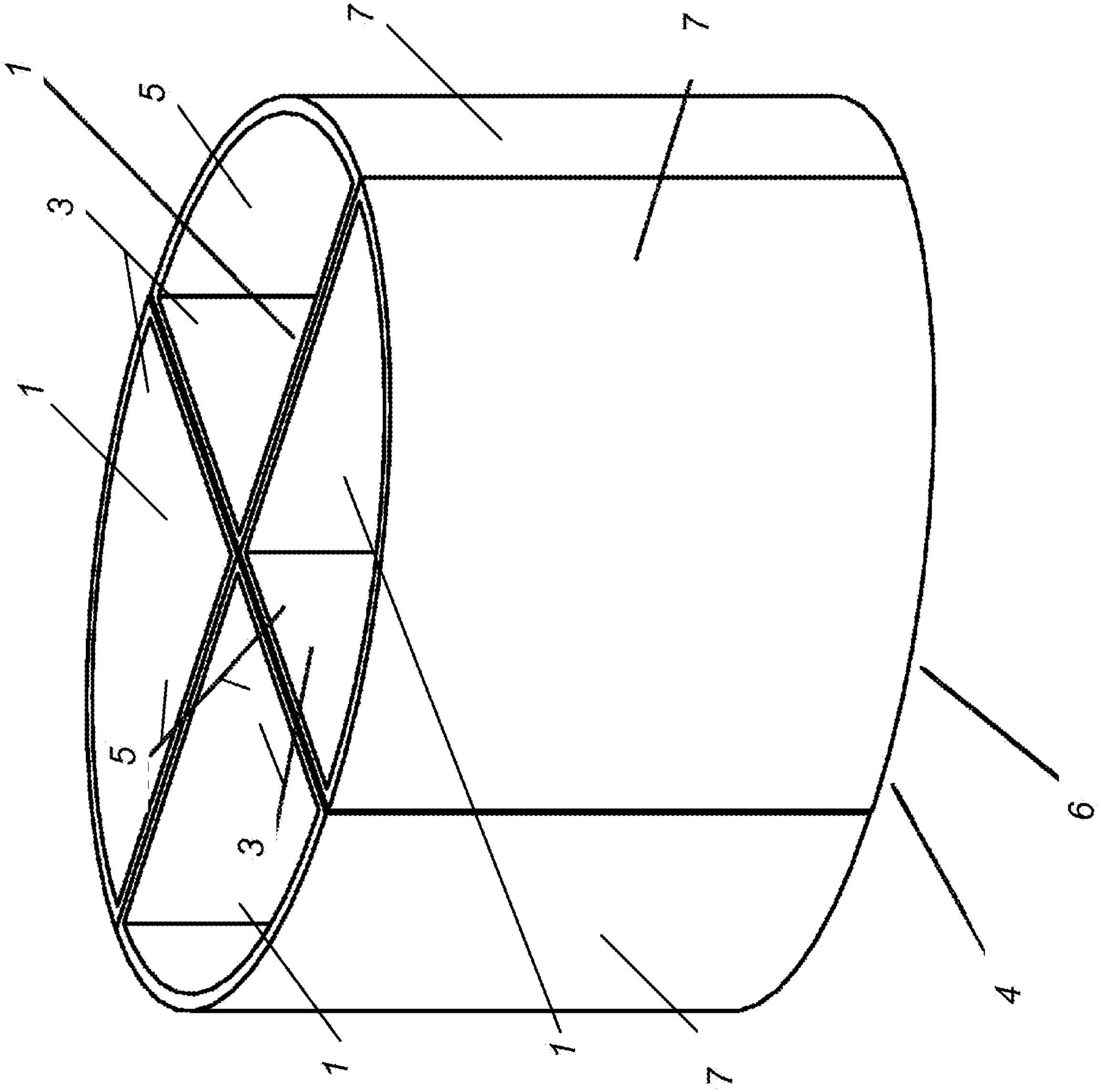
FIG. 10. illustrates one example of a perspective view of an embodiment, four divider inserts, of a device and system for a divider insert for a food-heating appliance.

Referring to FIG. 10, there is illustrated one example of a perspective view of an embodiment comprising four divider inserts 1. In an exemplary embodiment, each insert is constructed of food-grade, heat-resistant material for durability.

In an exemplary embodiment, a divider insert system for a food-heating appliance 10, comprising a plurality of containers 1 of varying sizes and shapes, each designed to fit within the interior space of the food-heating appliance 10 without interfering with its lid or cover.

Each container 1 includes a curvilinear side wall 7 that conforms to the curvilinear interior surface 8 of the food-heating appliance 10, ensuring a precise, gap-free fit. Additionally, at least one side wall 2 extends from the curvilinear side wall 7, wherein a single side wall 2 is directly connected to the curvilinear side wall 7, and wherein when multiple side walls 2 are used, they are connected together at one or more edges at various angles before collectively connecting to the curvilinear side wall 7. This configurable structure allows for adaptable compartment arrangements while maintaining stability and secure positioning within the appliance 10.

Each container 1 further comprises an open top 3 and a bottom 4, where the bottom 4 is securely joined to the curvilinear side wall 7 and the at least one side wall 2, forming a stable, food-holding compartment. The plurality of containers 1 are designed to fit entirely within the food-heating appliance 10, ensuring that they do not protrude beyond the appliance's interior and do not interfere with the appliance lid or cover, allowing for proper sealing and efficient heat retention.

When two or more containers 1 are selected and positioned together, their curvilinear side walls 7 collectively form a perimeter that matches the interior perimeter of the food-heating appliance 10, ensuring a continuous and secure fit. Additionally, the side walls 2 of adjoining containers 1 abut, creating structural rigidity that prevents unintended movement, tilting, or liquid leakage between compartments.

This divider insert system enhances compartmentalized cooking by enabling users to cook multiple food items simultaneously while maintaining flavor separation and consistent heat distribution. The system optimizes space utilization within the appliance 10, ensuring secure, stable positioning, and ease of use for improved cooking efficiency.

Figure 11:
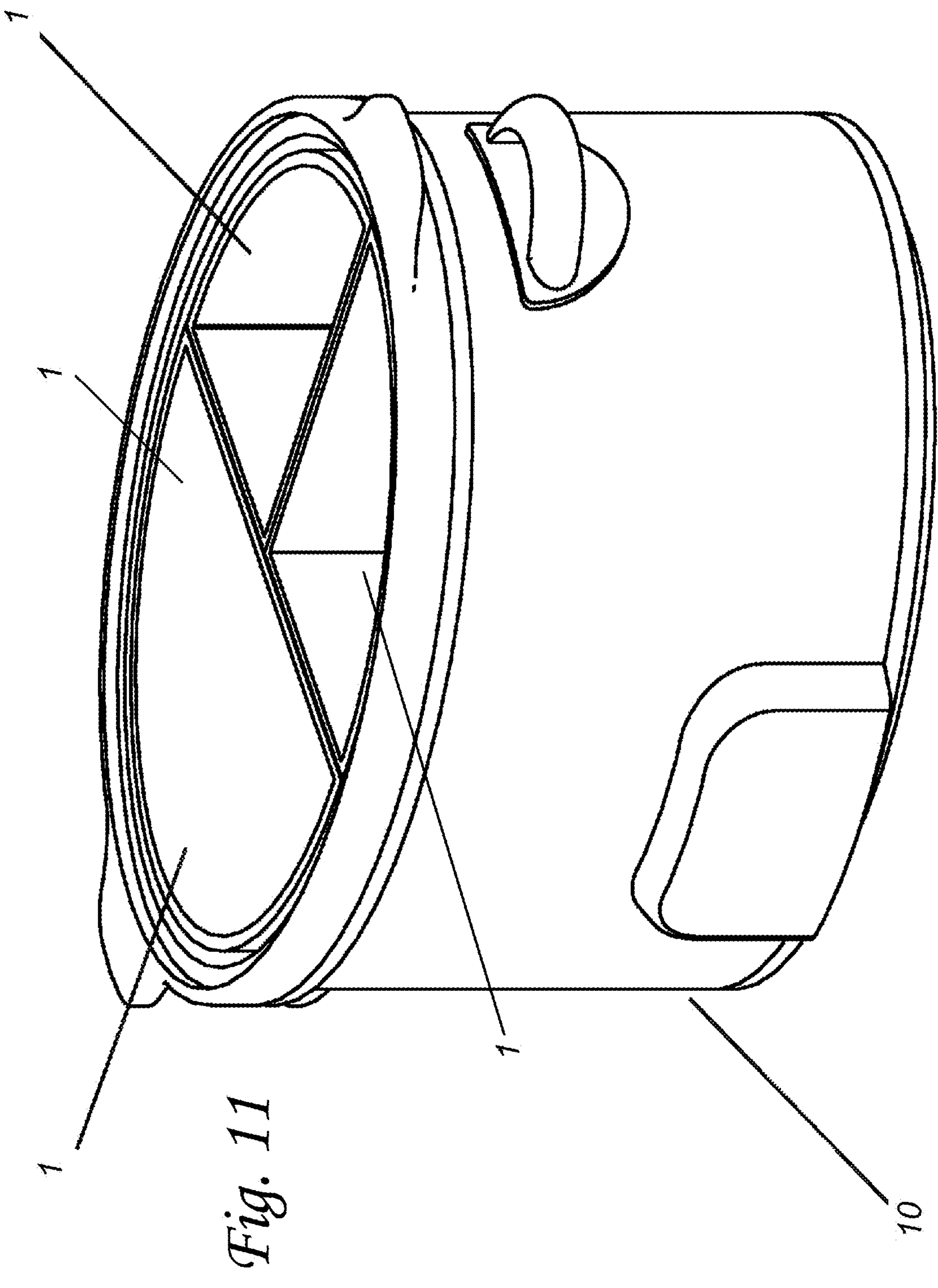
FIG. 11. illustrates one example of a perspective view of an embodiment, three divider inserts, of a device and system for a divider insert for a food-heating appliance inserted in a typical food-heating appliance.

Referring to FIG. 11, there is illustrated one example of a perspective view of an embodiment comprising three divider inserts 1. In an exemplary embodiment, the inserts create three compartments for simultaneous multi-item cooking.

Figure 12:
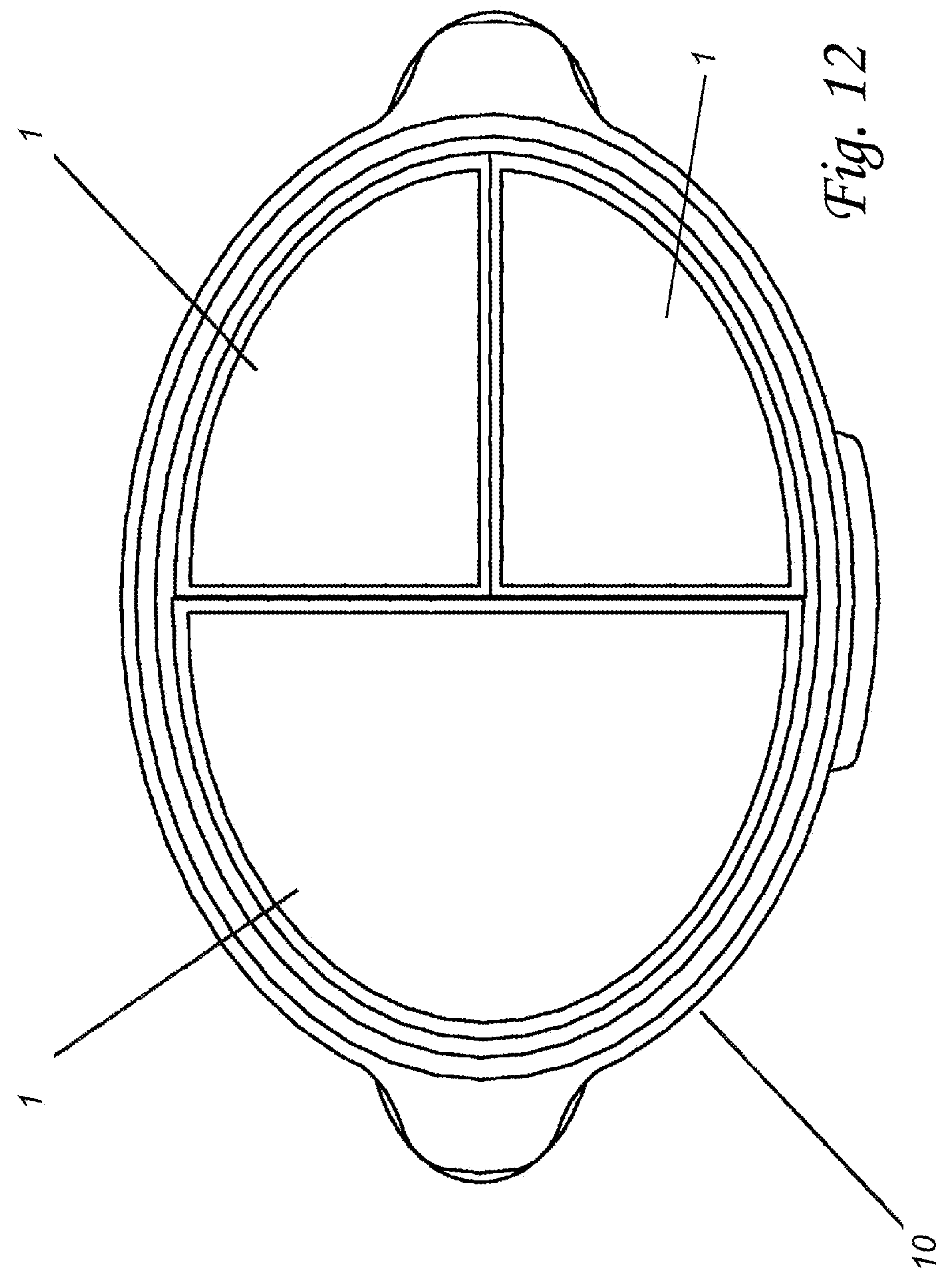
FIG. 12. illustrates one example of a top-down view of an embodiment, three divider inserts, of a device and system for a divider insert for a food-heating appliance inserted in a typical food-heating appliance.

Referring to FIG. 12, there is illustrated one example of a top-down view of an embodiment comprising three divider inserts 1. In an exemplary embodiment, the inserts form a triangular compartment arrangement within the food-heating appliance 10.

Figure 13:
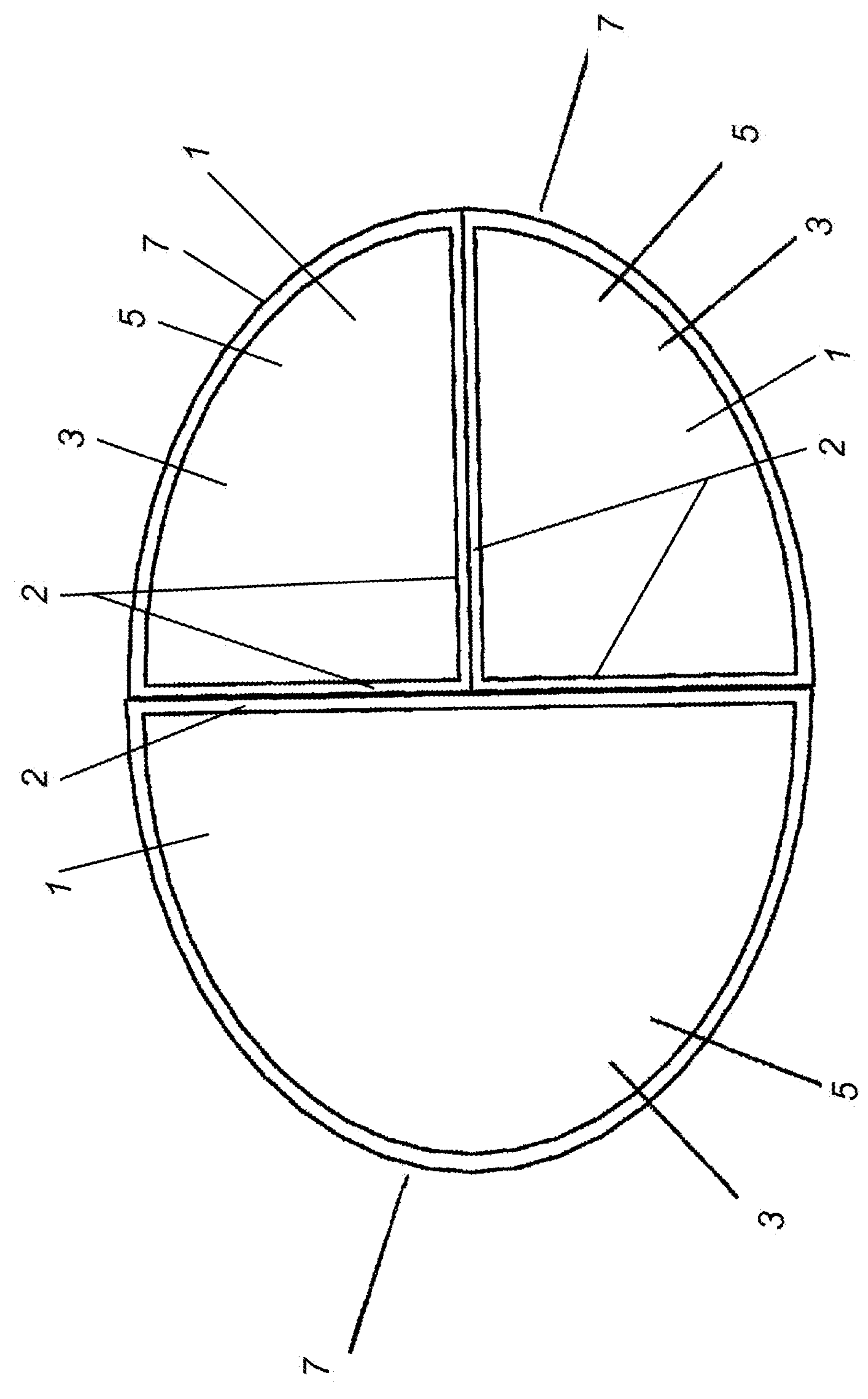
FIG. 13. illustrates one example of a top-down view of an embodiment, three divider inserts, of a device and system for a divider insert for a food-heating appliance.

Referring to FIG. 13, there is illustrated one example of a top-down view of an embodiment comprising three divider inserts 1 forming a sealed interface to prevent mixing of food.

Figure 14:
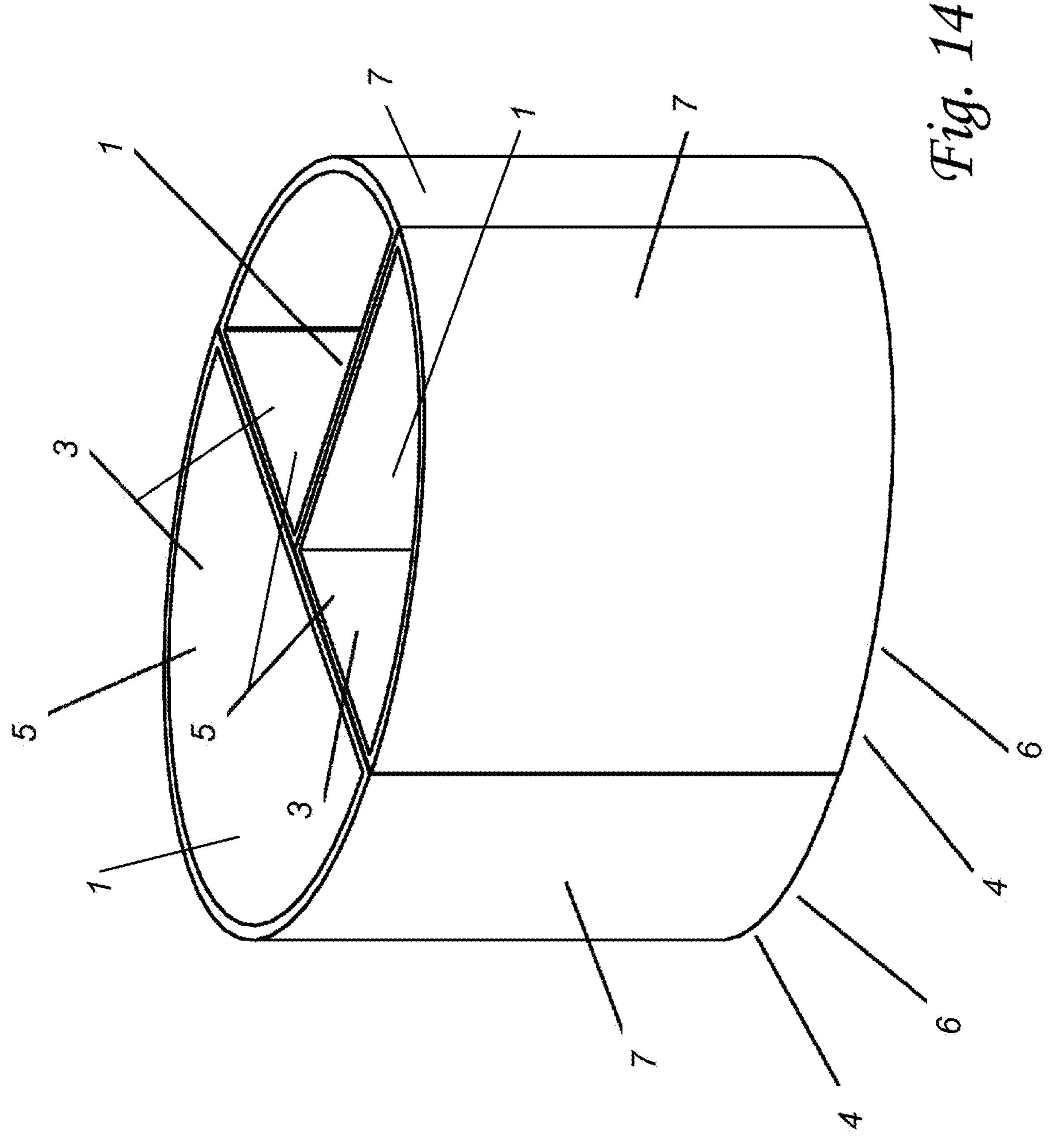
FIG. 14. illustrates one example of a perspective view of an embodiment, three divider inserts, of a device and system for a divider insert for a food-heating appliance.

Referring to FIG. 14, there is illustrated one example of a perspective view of an embodiment comprising three divider inserts 1, each with a curvilinear wall 7 and rigid sidewalls 2.

Figure 15:
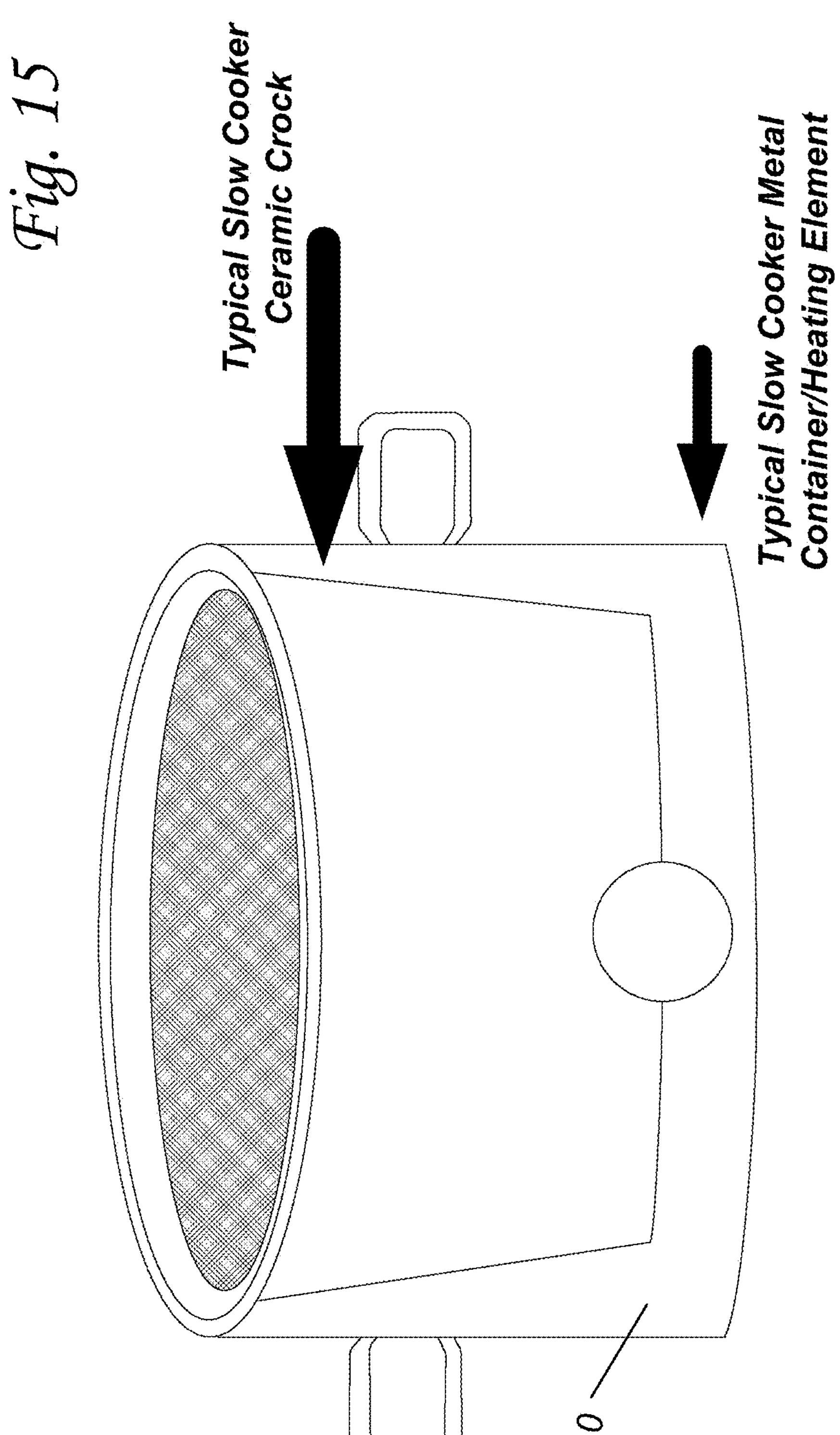
FIG. 15. illustrates one example of a side view a hypothetical food-heating appliance.

Referring to FIG. 15, there is illustrated one example of a side view of a food-heating appliance 10, providing context for the divider inserts 1.

Referring to FIGS. 16-19, there are illustrated examples of a single interconnected divider insert 1 with internal dividers forming two, three, or four compartments for customized cooking applications.

Figure 16:
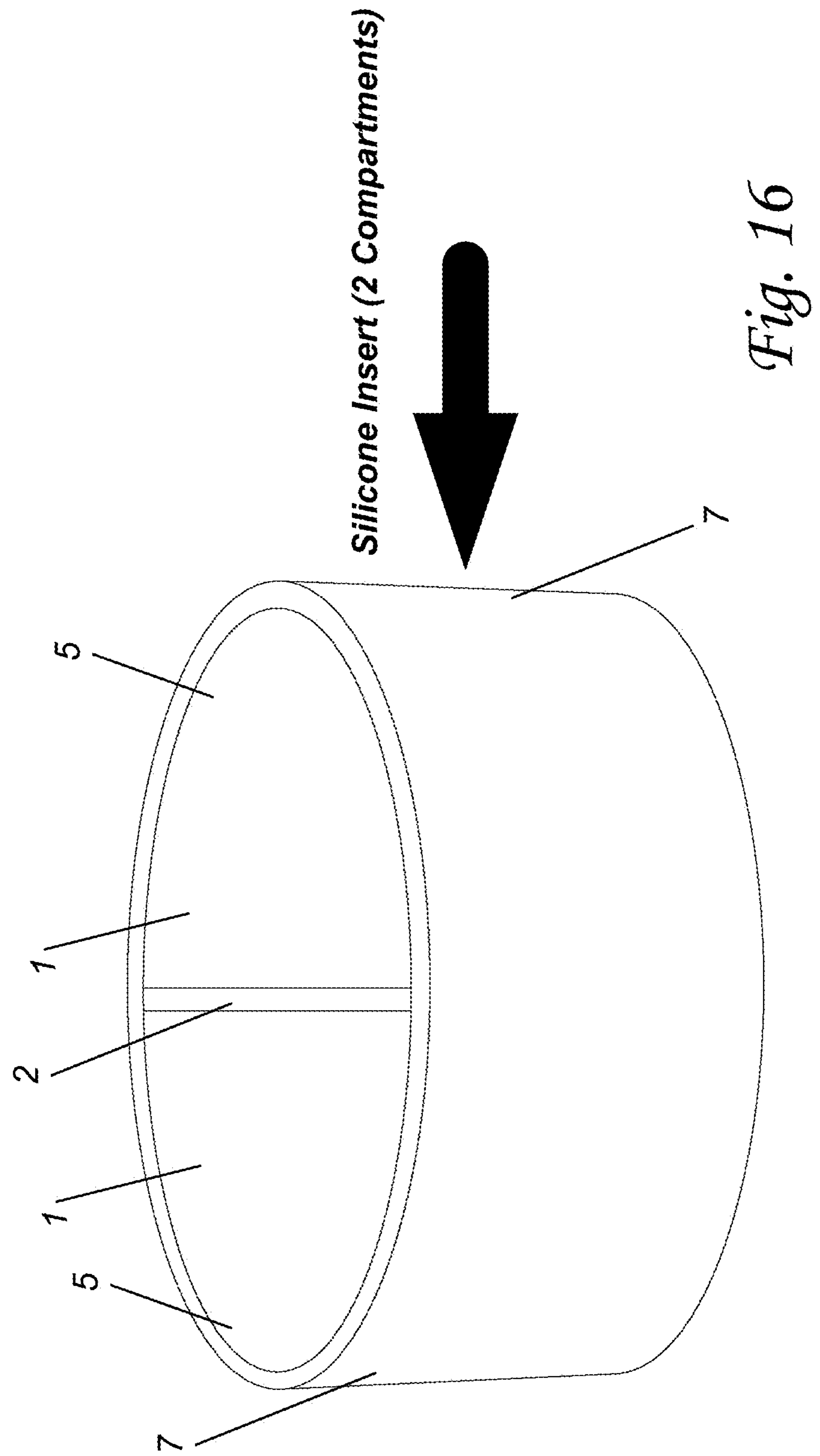
FIG. 16. illustrates one example of a side perspective view of an embodiment, a single interconnected insert with one divider running laterally to create two divided cooking compartments, of a device and system for a divider insert for a food-heating appliance.

In an exemplary embodiment, referring to FIG. 16, a divider insert system is illustrated, featuring a single interconnected insert that includes one divider 2 running laterally across the container 1 to form two divided cooking compartments. The curvilinear side wall 7 conforms to the curvilinear interior surface 8 of the food-heating appliance 10, ensuring a secure fit without gaps. The divider 2 extends between opposing sections of the curvilinear side wall 7, providing structural rigidity while allowing the food-heating appliance lid to fully close. The sealing edge 5 along the top perimeter ensures a tight fit, preventing movement or shifting during cooking. The lateral orientation of the divider 2 is particularly beneficial for users who wish to separate different food types within a single interconnected insert while maintaining equal heat distribution.

Figure 17:
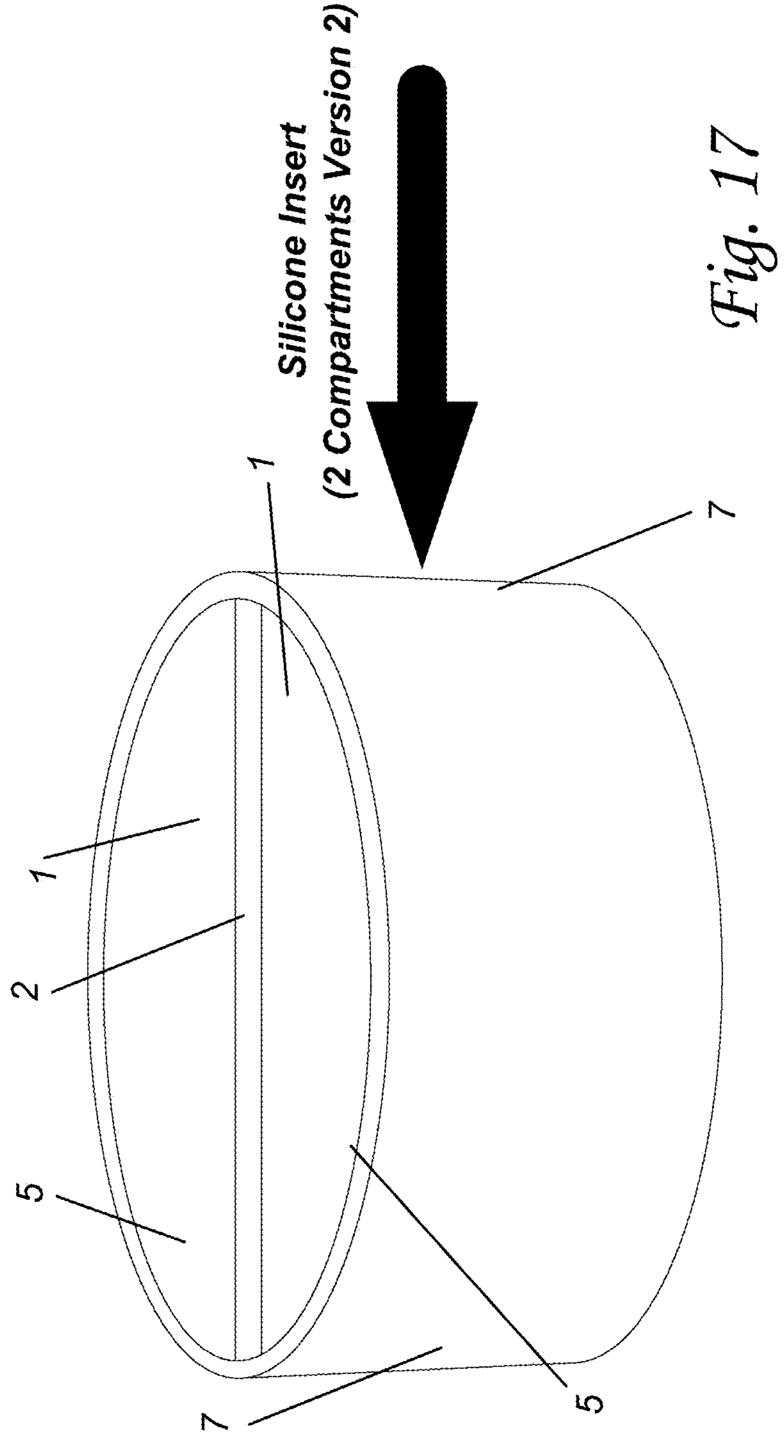
FIG. 17. illustrates one example of a side perspective view of an embodiment, a single interconnected insert with one divider running longitudinally to create two divided cooking compartments, of a device and system for a divider insert for a food-heating appliance.

In an exemplary embodiment, referring to FIG. 17, a divider insert system is illustrated with a single interconnected insert featuring one divider 2 running longitudinally across the container 1. Unlike FIG. 16, where the divider is laterally positioned, this longitudinal divider 2 extends from one end of the container 1 to the other, forming two compartments arranged lengthwise. The curvilinear side wall 7 continues to conform to the curvilinear interior surface 8 of the food-heating appliance 10, providing a continuous perimeter fit. The divider 2 is connected at one or more edges to the curvilinear side wall 7 at various angles, ensuring structural integrity and compartmentalization. The sealing edge 5 remains consistent with the previous embodiment, ensuring a stable fit and leak resistance. This configuration allows for compartmentalized cooking of elongated food items, such as vegetables, proteins, or grains, that may benefit from a longer, narrower cooking space.

Figure 18:
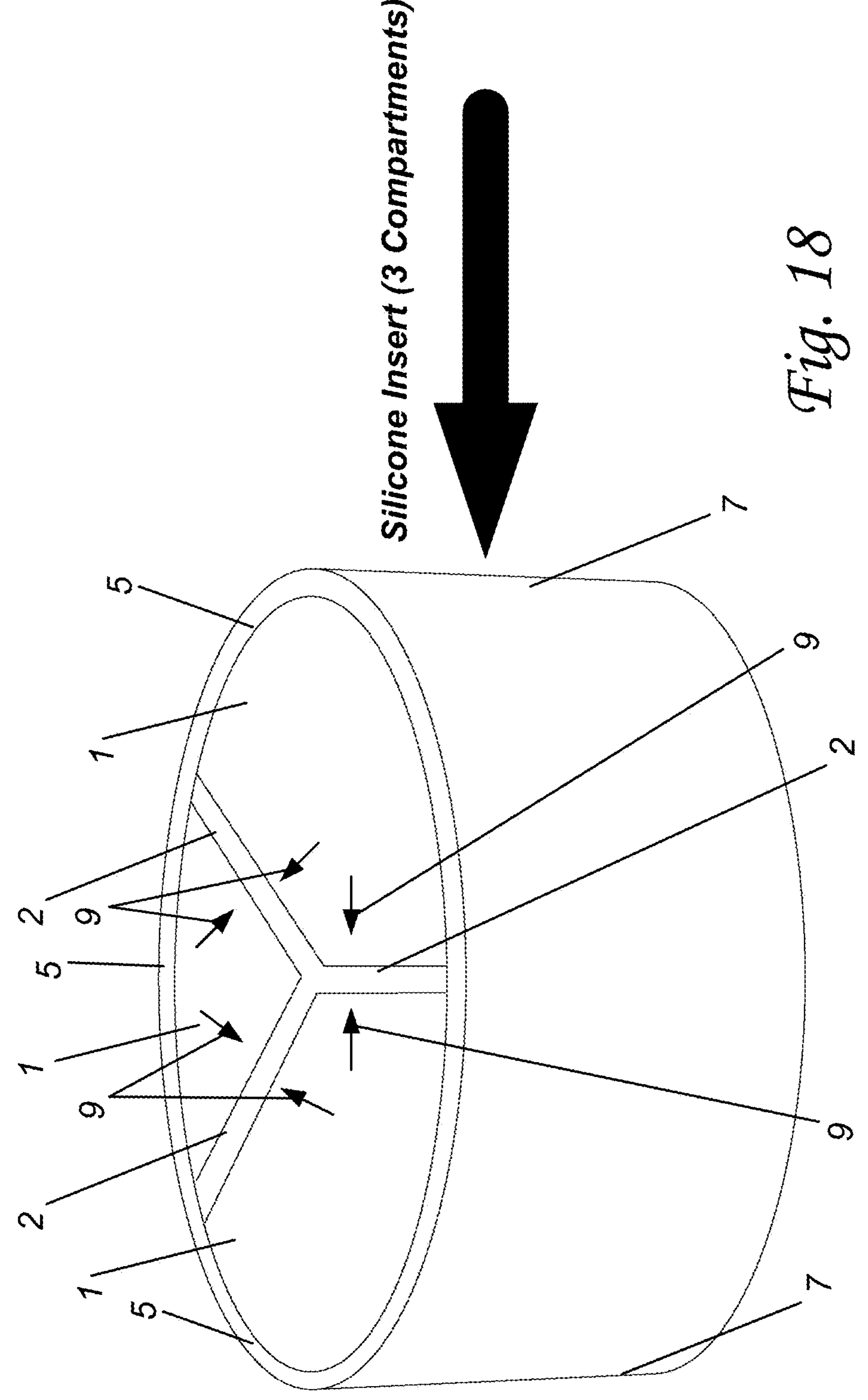
FIG. 18. illustrates one example of a side perspective view of an embodiment, a single interconnected insert with dividers to create three cooking compartments, of a device and system for a divider insert for a food-heating appliance.

In an exemplary embodiment, referring to FIG. 18, a divider insert system is illustrated with a single interconnected insert featuring multiple dividers 2 forming three cooking compartments. The curvilinear side wall 7 remains configured to match the curvilinear interior surface 8 of the food-heating appliance 10, ensuring a gap-free fit. Unlike the embodiments in FIG. 16 and FIG. 17, this embodiment introduces at least two dividers 2, which are connected together at various angles before ultimately joining the curvilinear side wall 7. The bottom 4 of the container 1 is secured to the side walls 2 and the curvilinear wall 7, forming a stable cooking compartment for multiple food items.

Additionally, the curvilinear side wall 7 and at least one side wall 2 are tapered 21 to facilitate easy insertion and removal. This tapering ensures that the containers 1 fit securely while allowing users to lift them out without unnecessary force. When food is placed within each compartment, it applies counteracting sidewall forces 9, which stabilize the structure, preventing collapse or leakage between compartments. This embodiment is particularly useful for preparing multiple food items with different cooking times while maintaining thermal efficiency and separate flavor profiles.

Figure 19:
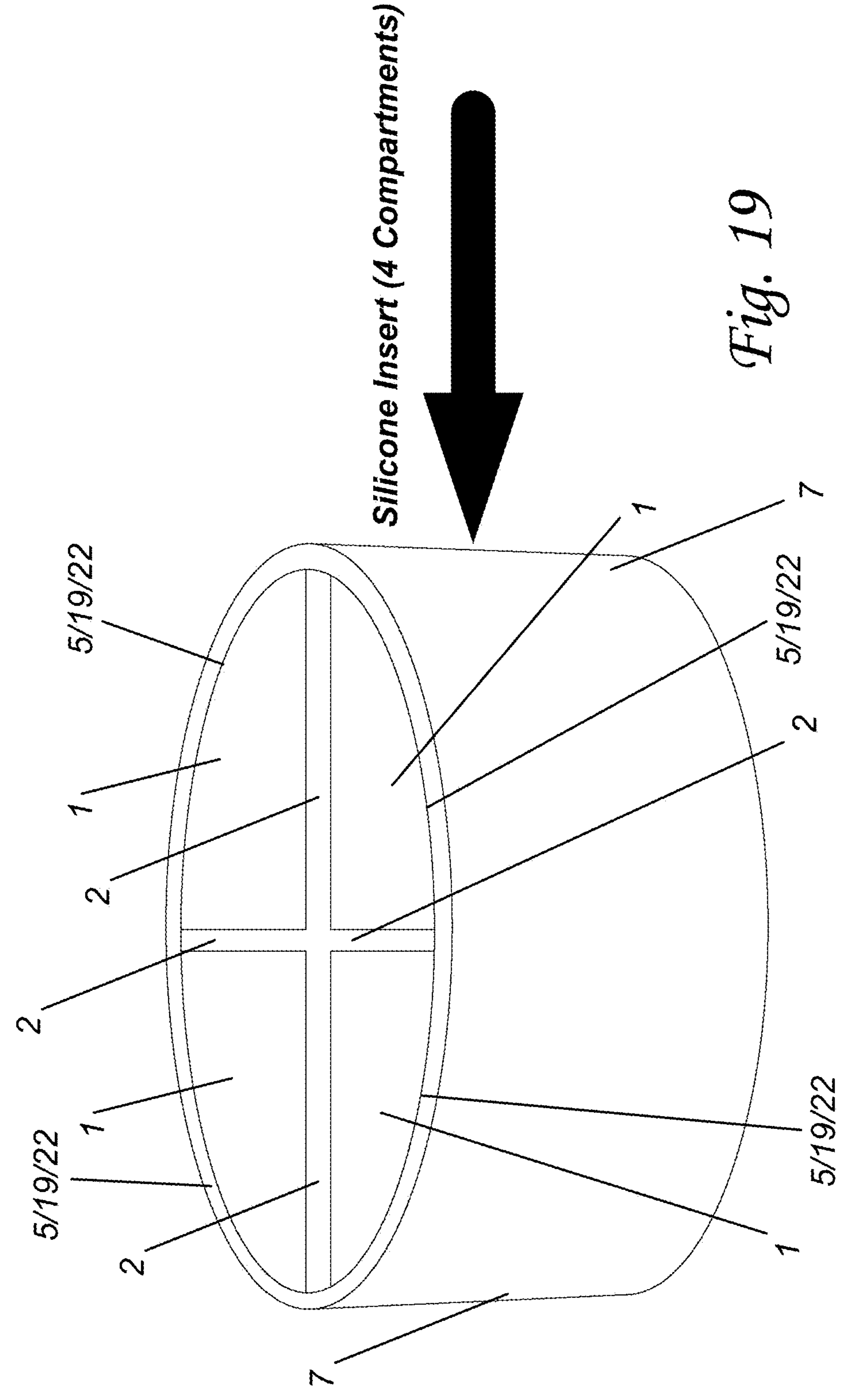
FIG. 19. illustrates one example of a side perspective view of an embodiment, a single interconnected insert with dividers to create four divided compartments, of a device and system for a divider insert for a food-heating appliance.

In an exemplary embodiment, referring to FIG. 19, a divider insert system is illustrated with four cooking compartments, created by multiple dividers 2 forming a fully partitioned insert. The curvilinear side wall 7 continues to conform to the curvilinear interior surface 8 of the food-heating appliance 10, providing a stable, continuous fit. In this configuration, each divider 2 is connected at varying angles, creating four distinct compartments for highly versatile meal preparation.

Additionally, a sealing edge 5 is included at the top perimeter, which may feature a heat-resistant gasket 6 to enhance fit and minimize liquid leakage. The gasket 6 ensures that the divider insert system remains securely positioned, reducing heat escape and improving moisture retention during cooking. Furthermore, handles 22 may be incorporated into the curvilinear side wall 7 or side walls 2, allowing for convenient insertion and removal of the container 1. This embodiment provides a fully modular cooking solution, allowing users to cook multiple foods simultaneously while maintaining separation, stability, and ease of use.

Figure 20:
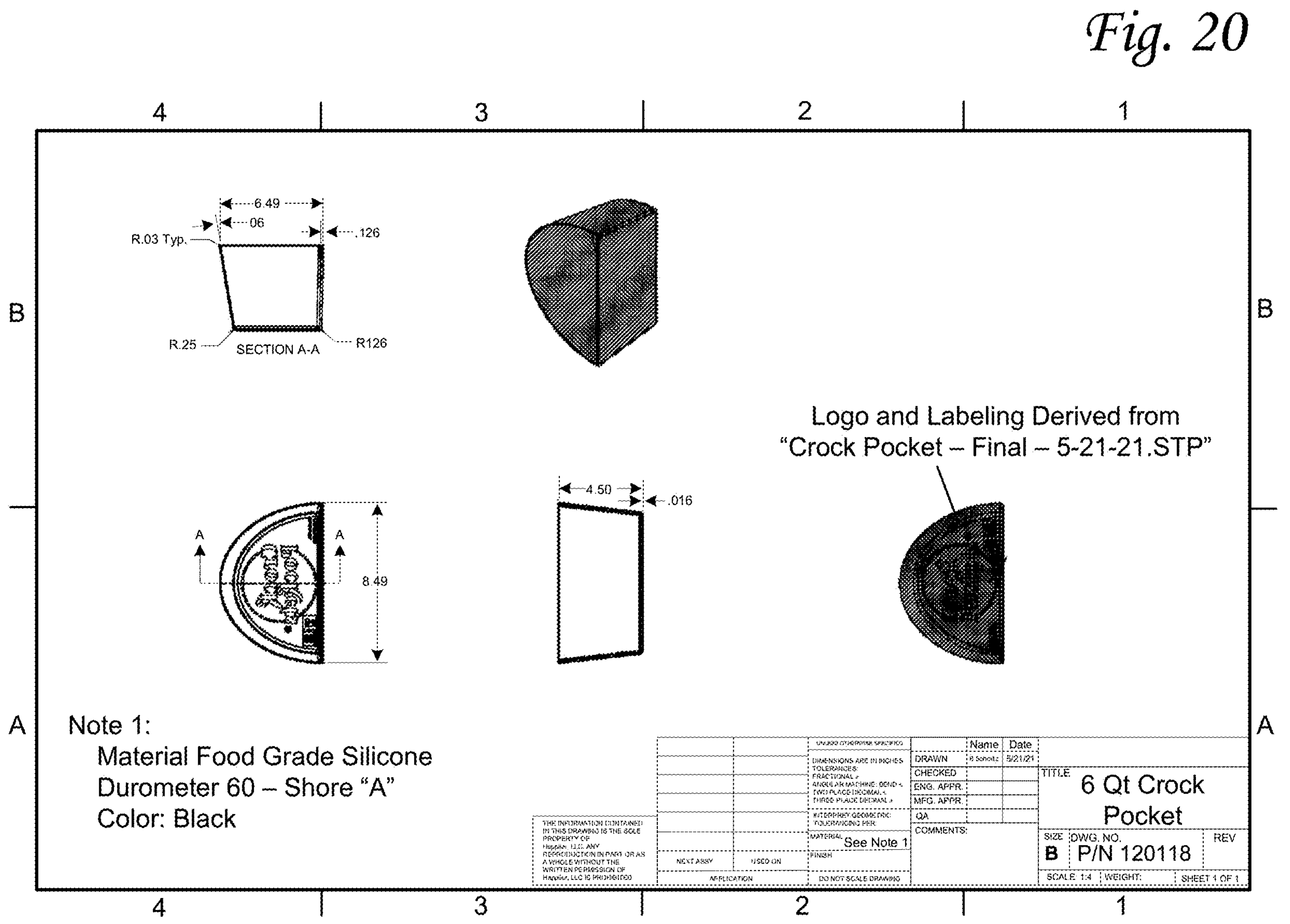
FIG. 20. illustrates one example of a cad drawing of a version of an embodiment of the device and system for a divider insert for a food-heating appliance.

Referring to FIG. 20, there is illustrated a CAD drawing of an embodiment of the divider insert system showing its design, structure, and materials.

While the preferred embodiment of the invention has been described, it will be understood that those skilled in the art, both now and in the future, may make various improvements and enhancements which fall within the scope of the claims which follow. These claims should be construed to maintain the proper protection for the invention first described.

What is claimed is:

1. A divider insert system configured for positioning within an interior space of a food-heating appliance, the food-heating appliance having a curvilinear interior surface, one or more heating surfaces, and a rim defining an upper boundary of the interior space, the divider insert system comprising:

a food-heating appliance having a curvilinear interior surface, one or more heating surfaces, and a rim defining an upper boundary of an interior space; and a plurality of containers configured to be received together within the interior space of the food-heating appliance, each of the plurality of containers comprising:

a curvilinear side wall configured to conform to a portion of a curvilinear interior surface of the food-heating appliance, forming a perimeter along the curvilinear interior surface;

at least one side wall connected to the curvilinear side wall;

an open top; and a closed bottom;

wherein the plurality of containers are dimensioned to fit entirely within the interior space of the food-heating appliance such that, when positioned for cooking during intended use, no portion of any of the plurality of containers extends above the rim of the food-heating appliance, and each container remains securely positioned within the interior space while maintaining full contact between container walls and the one or more heating surfaces of the food-heating appliance;

wherein, when the plurality of containers are positioned within the interior space of the food-heating appliance:

the curvilinear side wall of each of the plurality of containers is positioned to abut the curvilinear interior surface of the food-heating appliance;

the at least one side wall of each of the plurality of containers abuts the at least one side wall of an adjoining one of the plurality of containers; and wherein abutment of the curvilinear side wall of each of the plurality of containers with the curvilinear interior surface of the food-heating appliance and abutment of the at least one side wall of each of the plurality of containers with the at least one side wall of an adjoining one of the plurality of containers eliminates gaps along a perimeter defined by the plurality of containers within the interior space of the food-heating appliance, such that the plurality of containers necessarily remain securely positioned within the interior space while maintaining full contact with the one or more heating surfaces of the food-heating appliance to promote heat transfer efficiency.

2. The divider insert system of claim 1, wherein the plurality of containers each include the curvilinear side wall and the at least one side wall, and wherein for each of the plurality of containers that includes two or more of the at least one side wall the at least one side walls are joined at angles between 15 degrees and 165 degrees.

3. The divider insert system of claim 1, wherein the curvilinear side wall and the at least one side wall are made of a flexible molded material selected from the group consisting of food-grade silicone, thermoplastic elastomers, heat-resistant polymer composites, and a combination thereof.

4. The divider insert system of claim 1, wherein the curvilinear side wall or the at least one side wall is tapered to allow insertion into and removal from the food-heating appliance without interference with the interior surface of the food-heating appliance.

5. The divider insert system of claim 1, further comprising reinforced edges or ridges on the at least one side wall or the curvilinear side wall to provide additional structural strength.

6. The divider insert system of claim 1, further comprising at least one handle, the at least one handle configured as an extension of the at least one side wall, and folds down to prevent interference with the lid of the food-heating appliance.

7. The divider insert system of claim 1, wherein the at least one side wall includes venting perforations to regulate moisture and steam flow during cooking.

8. The divider insert system of claim 1, further comprising:

at least one venting perforation configured to promote heat circulation between compartments, ensuring that all sections of the divider insert system receive even cooking conditions, wherein the divider insert system is configured for use within the food-heating appliance selected from the group consisting of a slow cooker, a crock-pot, a pressure cooker, an air fryer, a convection oven, and a microwave oven.

9. A method of using the divider insert system of claim 1, the method comprising the steps of:

arranging the plurality of containers inside the food-heating appliance to form a compartmentalized structure;

placing food items into each of the plurality of containers selected;

operating the food-heating appliance to cook the food items;

removing the plurality of containers after cooking; and cleaning and reusing the plurality of containers.

10. A divider insert system configured for positioning within an interior space of a food-heating appliance, the food-heating appliance having a curvilinear interior surface, one or more heating surfaces, and a rim defining an upper boundary of the interior space, the divider insert system comprising:

a food-heating appliance having a curvilinear interior surface, one or more heating surfaces, and a rim defining an upper boundary of an interior space; and a plurality of containers configured to be received together within the interior space of the food-heating appliance, each of the plurality of containers being fabricated from a flexible molded material and each of the plurality of containers comprising:

a curvilinear side wall configured to conform to a portion of the curvilinear interior surface of the food-heating appliance, forming a perimeter along the curvilinear interior surface;

at least one side wall connected to the curvilinear side wall;

an open top; and a closed bottom;

wherein, when the plurality of containers are positioned for cooking during intended use, with a lid or a cover of the food-heating appliance closed, no portion of any of the plurality of containers is positioned above the rim of the food-heating appliance, thereby permitting the lid or the cover to fully close;

wherein, when the plurality of containers are positioned within the interior space of the food-heating appliance:

the at least one side wall of each of the plurality of containers abuts the at least one side wall of an adjoining one of the plurality of containers to provide rigidity to the at least one side wall that abut when the plurality of containers are filled with food; and the plurality of containers maintains full contact with the one or more heating surfaces of the food-heating appliance;

wherein abutment of the curvilinear side wall with the curvilinear interior surface of the food-heating appliance, and abutment of the at least one side wall that are adjoined eliminates gaps at the locations of abutment between the plurality of containers, maximizing utilization of the food-heating appliance volume, preventing slippage of the plurality of containers within the food-heating appliance, and providing collective structural rigidity to the plurality of containers.

11. The divider insert system of claim 10, wherein the curvilinear side wall or one or more of the at least one side wall includes at least one handle to assist with insertion and removal.

12. The divider insert system of claim 10, wherein at least one container of the plurality of containers includes a removable divider positioned within an interior of at least one of the plurality of containers to subdivide the interior into two or more sub-compartments.

13. The divider insert system of claim 10, further comprising thermally insulating layers integrated into the surface of the closed bottom.

14. The divider insert system of claim 10, wherein the plurality of containers are configured to interlock or nest side-by-side within the food-heating appliance to form a customizable compartmentalized arrangement.

15. The divider insert system of claim 10, wherein at least one of the plurality of containers includes temperature-sensitive indicators to visually indicate when food reaches a predetermined cooking temperature.

16. A method of using the divider insert system of claim 10, the method comprising the steps of:

positioning at least one of the plurality of containers into the food-heating appliance;

cooking the food at a predetermined temperature;

removing the plurality of containers after cooking; and storing the plurality of containers for future use.

17. A divider insert system configured for positioning within an interior space of a food-heating appliance, the food-heating appliance having a curvilinear interior surface, one or more heating surfaces, and a rim defining an upper boundary of the interior space, the divider insert system comprising:

a food-heating appliance having a curvilinear interior surface, one or more heating surfaces, and a rim defining an upper boundary of an interior space; and a plurality of containers configured to be received together within the interior space of the food-heating appliance, each of the plurality of containers comprising:

a curvilinear side wall configured to conform to a portion of the curvilinear interior surface of the food-heating appliance, forming a perimeter along the curvilinear interior surface;

at least one side wall connected to the curvilinear side wall;

an open top; and a closed bottom;

wherein, when the plurality of containers are positioned for cooking during intended use, with a lid or a cover of the food-heating appliance closed, no portion of any of the plurality of containers is positioned above the rim of the food-heating appliance, thereby permitting the lid or the cover to fully close;

wherein, when the plurality of containers are positioned within the interior space of the food-heating appliance:

the curvilinear side wall of each of the plurality of containers is positioned to abut the curvilinear interior surface of the food-heating appliance;

the at least one side wall of each of the plurality of containers abuts the at least one side wall of an adjoining one of the plurality of containers; and the plurality of containers maintains full contact with the one or more heating surfaces of the food-heating appliance;

wherein the plurality of containers are interconnected to one another such that, when the plurality of containers are positioned within the interior space of the food-heating appliance, the plurality of containers remain in a fixed arrangement during cooking; and wherein the interconnection of the plurality of containers together with abutment of the curvilinear side wall with the curvilinear interior surface of the food-heating appliance, and abutment of the at least one side wall that are adjoined eliminates gaps at the locations of abutment, maximizing utilization of the food-heating appliance volume, preventing slippage of the plurality of containers within the food-heating appliance, and providing collective structural rigidity to the plurality of containers.

18. The divider insert system of claim 17, further comprising at least one handle, the at least one handle is an extension of the at least one side wall, and folds down to prevent interference with the lid of the food-heating appliance.

19. The divider insert system of claim 17, wherein the one or more containers are insertable into and removable from the food-heating appliance without interfering with the interior surface of the food-heating appliance.

20. A method of using the divider insert system of claim 17, the method comprising the steps of:

selecting one or more containers from the plurality of containers;

inserting each of the one or more containers selected into the food-heating appliance;

placing a plurality of uncooked food items into each of the one or more containers selected;

operating the food-heating appliance to cook the food items; and removing the one or more containers from the food-heating appliance after cooking is complete.

* * * * *